United States Patent
Nelson et al.

(10) Patent No.: US 10,512,839 B2
(45) Date of Patent: Dec. 24, 2019

(54) INTERACTING WITH THREE-DIMENSIONAL GAME ELEMENTS USING GAZE DETECTION

(71) Applicant: IGT, Las Vegas, NV (US)

(72) Inventors: Dwayne Nelson, Las Vegas, NV (US); Johnny L. Palchetti, Henderson, NV (US)

(73) Assignee: IGT, Las Vegas, NV (US)

( * ) Notice: Subject to any disclaimer, the term of this patent is extended or adjusted under 35 U.S.C. 154(b) by 22 days.

(21) Appl. No.: 15/718,747

(22) Filed: Sep. 28, 2017

(65) Prior Publication Data
US 2019/0091565 A1  Mar. 28, 2019

(51) Int. Cl.
| | | |
|---|---|---|
| A63F 13/213 | (2014.01) | |
| G07F 17/32 | (2006.01) | |
| A63F 13/285 | (2014.01) | |
| A63F 13/2145 | (2014.01) | |
| A63F 13/25 | (2014.01) | |

(52) U.S. Cl.
CPC ............ *A63F 13/285* (2014.09); *G07F 17/32* (2013.01); *G07F 17/3206* (2013.01); *A63F 13/213* (2014.09); *A63F 13/2145* (2014.09); *A63F 13/25* (2014.09)

(58) Field of Classification Search
None
See application file for complete search history.

(56) References Cited

U.S. PATENT DOCUMENTS

| | | |
|---|---|---|
| 6,222,465 B1 | 4/2001 | Kumar et al. |
| 7,815,507 B2 | 10/2010 | Parrott et al. |
| 8,643,680 B2 | 2/2014 | Baldwin et al. |
| 8,721,422 B2 | 5/2014 | Casey et al. |
| 9,244,527 B2 | 1/2016 | Lathrop et al. |
| 9,308,439 B2 | 4/2016 | Aoki et al. |
| 9,715,781 B2 | 7/2017 | Lyons et al. |
| 2011/0304606 A1 | 12/2011 | Walsh |
| 2012/0105486 A1 | 5/2012 | Lankford et al. |
| 2012/0322542 A1 | 12/2012 | Chudd et al. |
| 2013/0267317 A1* | 10/2013 | Aoki .............. G07F 17/3206 463/32 |
| 2014/0066178 A1* | 3/2014 | Kelly .............. G07F 17/3211 463/25 |
| 2014/0323194 A1 | 10/2014 | Keilwert |
| 2015/0169053 A1 | 6/2015 | Bozarth et al. |
| 2016/0180636 A1* | 6/2016 | David .............. G07F 17/3211 463/32 |
| 2016/0252957 A1 | 9/2016 | Raux |

* cited by examiner

*Primary Examiner* — Damon J Pierce
(74) *Attorney, Agent, or Firm* — Sage Patent Group

(57) ABSTRACT

A method of operating an electronic gaming machine includes displaying a three-dimensional game component to a viewer of the electronic gaming machine, wherein the three-dimensional game component is generated to have an apparent spatial position having coordinates including a z-coordinate in a direction extending toward the viewer; detecting a gaze direction of the viewer; comparing the gaze direction of the viewer to the apparent spatial position of the three-dimensional game component; determining that the gaze of the viewer is directed toward the three-dimensional game component; and responsive to determining that the gaze of the viewer is directed toward the three-dimensional game component, changing the z-coordinate of the apparent spatial position of the three-dimensional game component.

20 Claims, 24 Drawing Sheets

INTERACTING WITH THREE-DIMENSIONAL GAME ELEMENTS USING GAZE DETECTION

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD

Embodiments described herein relate to the field of electronic gaming machines, and in particular to electronic gaming machines that track a player's eye gaze.

BACKGROUND

In casinos and other establishments, players may play wagering games using electronic gaming machines (EGMs), such as video gaming terminals. EGMs may include other types of systems, such as online gaming systems that enable users to play games using computer devices, such as desktop computers, laptops, tablet computers or smart phones, computer programs for use on a computer device, gaming consoles that are connectable to a display, such as a television or computer screen, and others.

EGMs may be configured to enable users to play games with a touch interface. Example games may be a slot machine game, which may involve a reel of symbols that may move by pulling a lever or pushing a button to activate the reel of symbols. A user may win a prize based on the symbols displayed on the reel. In addition to slot machine-style games, EGMs may be configured to enable users to play a variety of different types of games. For example, some EGMs are configured to provide a tile-matching game, a video poker game, a wheel of fortune game, or other style of game. To interact with a game component of the game, the user may have to press a button that is part of the machine hardware, or the user may have to touch a button displayed on a display screen.

To provide a more immersive and attractive gaming experience, EGM manufacturers have recently been increasing the size of video display screens, and in some cases incorporating three-dimensional display screens, in EGMs. Meanwhile, manufacturers have also been increasing the complexity of content that is displayed on EGMs as players demand more and more complex and visually stimulating content from wagering games. As EGMs and the content displayed on EGMs becomes more complex, there is an increasing need to provide more intuitive and functional systems and methods for players to interact with the EGMs.

SUMMARY

A method of operating an electronic gaming machine according to some embodiments includes displaying a three-dimensional game component to a viewer of the electronic gaming machine, wherein the three-dimensional game component is generated to have an apparent spatial position, the apparent spatial position of the three-dimensional game component having coordinates including a z-coordinate in a direction extending toward the viewer; detecting a gaze direction of the viewer; comparing the gaze direction of the viewer to the apparent spatial position of the three-dimensional game component; determining that the gaze of the viewer is directed toward the three-dimensional game component; and responsive to determining that the gaze of the viewer is directed toward the three-dimensional game component, changing the z-coordinate of the apparent spatial position of the three-dimensional game component.

The viewer may be a player of a game on the electronic gaming machine, or may be a non-player (i.e., someone who is not actively engaged in playing a game on the electronic gaming machine), such as a bystander who is watching a person playing the game or simply walking past the electronic gaming machine or looking at the electronic gaming machine.

Changing the z-coordinate of the three-dimensional game component may include moving the apparent spatial position of the three-dimensional game component towards the viewer. In some embodiments, changing the z-coordinate of the three-dimensional game component may include moving the apparent spatial position of the three-dimensional game component away from the viewer.

The method may further include displaying a plurality of other three-dimensional game components, each of the other three-dimensional game components having respective apparent spatial positions; and responsive to determining that the gaze of the viewer is directed toward the first three-dimensional game component, changing z-coordinates of the apparent spatial positions of the other three-dimensional game components.

Changing the z-coordinates of the other three-dimensional game components may include moving the apparent spatial positions of the other three-dimensional game component towards the viewer. In some embodiments, changing the z-coordinates of the other three-dimensional game components may include moving the apparent spatial positions of the other three-dimensional game components away from the viewer.

The method may further include detecting a position of at least one part of a hand of the viewer in a viewer interaction zone between the electronic gaming machine and the viewer; determining that the position of the at least one part of the viewer's hand corresponds to the apparent spatial position of the three-dimensional game component while the gaze of the viewer is directed toward the three-dimensional game component; and providing tactile feedback to the at least one part of the viewer's hand based on the determined position of at least one part of the viewer's hand in front of the display device.

Providing tactile feedback to the at least one part of the viewer's hand may include transmitting ultrasonic sound waves towards the at least one part of the viewer's hand.

The method further may further include determining that the position of the at least one part of the viewer's hand corresponds to the apparent spatial position of a second three-dimensional game component while the gaze of the viewer is directed toward the first three-dimensional game component; and providing different tactile feedback to the at least one part of the viewer's hand based on the determined position of at least one part of the viewer's hand in front of the display device.

Providing different tactile feedback to the at least one part of the viewer's hand may include providing no tactile feedback to the at least one part of the viewer's hand while the position of the at least one part of the viewer's hand corresponds to the apparent spatial position of the second three-dimensional game component and the gaze of the viewer is directed toward the first three-dimensional game component.

The method may further include providing audible feedback to the viewer in response to determining that the position of the at least one part of the viewer's hand corresponds to the apparent spatial position of the three-dimensional game component and the gaze of the viewer is directed toward the three-dimensional game component.

An electronic gaming machine according to some embodiments includes a game controller; a three-dimensional display device; a display controller coupled to the game controller and the three-dimensional display device; and a gaze detection unit coupled to the game controller and configured to detect a gaze direction of the viewer. The game controller is configured to (a) display three-dimensional images on the three-dimensional display device, the three-dimensional images including at least one three-dimensional game component, wherein the three-dimensional game component is generated to have an apparent spatial position having coordinates including a z-coordinate in a direction extending toward a viewer of the electronic gaming machine, (b) determine that the gaze of the viewer is directed toward the three-dimensional game component, and (c) responsive to determining that the gaze of the viewer is directed toward the three-dimensional game component, change the z-coordinate of the apparent spatial position of the three-dimensional game component.

The game controller may be configured to: (a) display a plurality of other three-dimensional game components on the three-dimensional display device, each of the other three-dimensional game components having respective apparent spatial positions, and (b) responsive to determining that the gaze of the viewer is directed toward the first three-dimensional game component, change z-coordinates of the apparent spatial positions of the other three-dimensional game components.

The electronic gaming machine may further include a gesture tracking unit coupled to the game controller and configured to detect a position of at least one part of a hand of the viewer in a viewer interaction zone between the electronic gaming machine and the viewer; and a haptic feedback unit coupled to the game controller. The game controller is configured to determine that the position of the at least one part of the viewer's hand corresponds to the apparent spatial position of the three-dimensional game component while the gaze of the viewer is directed toward the three-dimensional game component; and the haptic feedback unit is configured to provide tactile feedback to the at least one part of the viewer's hand based on the determined position of at least one part of the viewer's hand in front of the display device.

Providing tactile feedback to the at least one part of the viewer's hand may include transmitting ultrasonic sound waves towards the at least one part of the viewer's hand.

The game controller may be further configured to determine that the position of the at least one part of the viewer's hand corresponds to the apparent spatial position of a second three-dimensional game component while the gaze of the viewer is directed toward the first three-dimensional game component; and the haptic feedback unit may be configured to provide different tactile feedback to the at least one part of the viewer's hand based on the determined position of at least one part of the viewer's hand in front of the display device.

Providing different tactile feedback to the at least one part of the viewer's hand may include providing no tactile feedback to the at least one part of the viewer's hand while the position of the at least one part of the viewer's hand corresponds to the apparent spatial position of the second three-dimensional game component and the gaze of the viewer is directed toward the first three-dimensional game component.

The electronic gaming machine may further include an audio board coupled to the game controller; and a speaker coupled to the audio board, and the game controller may be further configured to provide audible feedback to the viewer in response to determining that the position of the at least one part of the viewer's hand corresponds to the apparent spatial position of the three-dimensional game component and the gaze of the viewer is directed toward the three-dimensional game component.

A method of operating an electronic gaming machine including an eye/head position tracking unit and a gaze detection unit includes detecting a head position of a viewer of the electronic gaming machine using the eye/head position tracking unit; detecting a gaze direction of the viewer using the gaze detection unit; comparing the detected head position of the viewer to the detected gaze direction of the viewer; and adjusting one of the gaze detection unit and the eye/head position tracking unit in response to determining that the detected head position of the viewer does not correspond to the detected gaze direction of the viewer.

The method may further include displaying a three-dimensional object to the viewer of the electronic gaming machine, the three-dimensional object having a predetermined spatial position; and drawing attention to the displayed three-dimensional object. Detecting the head position and gaze direction of the viewer may be performed after drawing attention to the displayed three-dimensional object.

Some embodiments provide computer program products including a non-transitory computer readable storage medium on which computer program instructions are stored, the computer program instructions configuring an electronic gaming machine to perform operations including displaying a three-dimensional game component to a viewer of the electronic gaming machine, wherein the three-dimensional game component is generated to have an apparent spatial position, the apparent spatial position of the three-dimensional game component having coordinates including a z-coordinate in a direction extending toward the viewer; detecting a gaze direction of the viewer; comparing the gaze direction of the viewer to the apparent spatial position of the three-dimensional game component; determining that the gaze of the viewer is directed toward the three-dimensional game component; and responsive to determining that the gaze of the viewer is directed toward the three-dimensional game component, changing the z-coordinate of the apparent spatial position of the three-dimensional game component.

Still further embodiments provide an electronic gaming machine including a processor circuit and a memory coupled to the processor circuit and storing computer program instructions that configure the electronic gaming machine to perform operations including displaying a three-dimensional game component to a viewer of the electronic gaming machine, wherein the three-dimensional game component is generated to have an apparent spatial position, the apparent spatial position of the three-dimensional game component having coordinates including a z-coordinate in a direction extending toward the viewer; detecting a gaze direction of the viewer; comparing the gaze direction of the viewer to the apparent spatial position of the three-dimensional game component; determining that the gaze of the viewer is directed toward the three-dimensional game component; and responsive to determining that the gaze of the viewer is directed toward the three-dimensional game component, changing the z-coordinate of the apparent spatial position of the three-dimensional game component.

Still further embodiments provide an electronic gaming machine comprising a processor circuit, a memory coupled to the processor circuit, a three-dimensional display device, and a gaze detection unit. The three-dimensional display device is configured to display a three-dimensional game component to a viewer of the electronic gaming machine, wherein the three-dimensional game component is generated to have an apparent spatial position, the apparent spatial position of the three-dimensional game component having coordinates including a z-coordinate in a direction extending toward the viewer. The gaze detection unit is configured to detect a gaze direction of the viewer. The processor circuit is configured to compare the gaze direction of the viewer to the apparent spatial position of the three-dimensional game component; determine that the gaze of the viewer is directed toward the three-dimensional game component; and responsive to determining that the gaze of the viewer is directed toward the three-dimensional game component, change the z-coordinate of the apparent spatial position of the three-dimensional game component.

DETAILED DESCRIPTION OF EMBODIMENTS

Figure 1A:
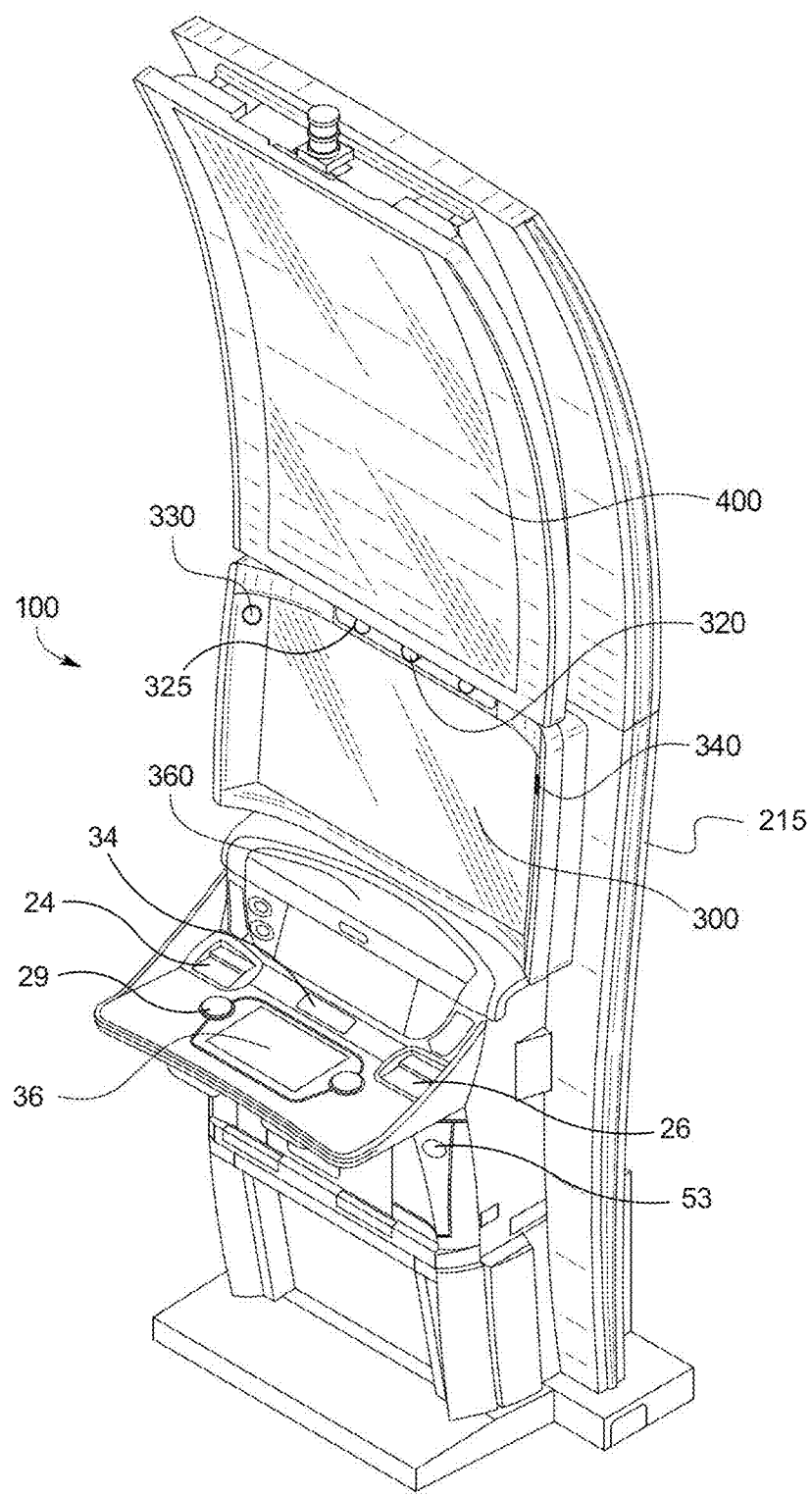
FIG. 1A is a perspective view of an electronic gaming machine according to some embodiments.

Embodiments described herein relate to enhanced electronic gaming machines (EGMs) that are capable of displaying game components in three dimensions. As used herein, a game component is any object, item, icon, avatar, image or other element that is displayed by a game operated on an electronic gaming machine, and may include game elements, such as reels, cards, tiles, etc., that are displayed during a current play of a game or other elements, such as information elements, counters, timers, etc., displayed during or between plays of a game.

Game components that are displayed in three dimensions have an apparent position, when viewed by a player of the EGM, that can be characterized using coordinates in a three-dimensional coordinate system, such as a Cartesian coordinate system, a cylindrical coordinate system or a spherical coordinate system. Embodiments of the inventive concepts will be described in the context of a Cartesian coordinate system; however, the inventive concepts are not limited thereto.

Accordingly, some embodiments of the inventive concepts provide methods of operating an EGM that include displaying a three-dimensional game component to a viewer of the EGM, wherein the three-dimensional game component is generated to have apparent position coordinates including first and second coordinates in directions parallel to a plane facing the player and a third coordinate in a direction extending toward the player. The systems/methods detect a gaze direction of a viewer and, from the gaze detection data, determine that the viewer is looking at the three-dimensional game component. In response to determining that the viewer is looking at the three-dimensional game component, the systems/methods alter the third coordinate of the three-dimensional game component so that the game component appears to move either toward or away from the viewer.

Although the viewer is described below primarily as a player of a game on the EGM, it will be appreciated that the viewer may not be actively engaged in playing a game on the EGM, but may be a bystander watching a game being played on the EGM or may be simply looking at the EGM while no game is in progress, such as when the EGM is in attract mode.

The EGM may include at least one data capture camera device that is configured to detect a head position of the player to facilitate presentation of a three-dimensional image to the player and detection of the player's gaze direction. The EGM may also include at least one further data capture camera device that is configured to monitor the eye gaze of the player to collect player eye gaze data. Such monitoring may be performed continuously or selectively when eye gaze data is needed. Player head position detection and eye gaze detection are described in more detail below.

The EGM may be configured with algorithms to process image data from the data capture camera devices to detect in real-time the position of the player's eyes in three-dimensional (3D) space and the focus of the player's gaze in two dimensional-space (2D) or 3D space. The position of the player's eyes may be the physical location of the player's eyes in 3D space. The focus of the player's gaze may be the focus of the gaze on a display device of the EGM. A game controller in the EGM may determine a location of the eye gaze of the player relative to a viewing area of an interactive game environment displayed on the EGM using the player eye gaze data.

In some embodiments, a gaze detection unit may perform the operations of processing image data from the data capture camera devices to detect in real-time the position of the player's eyes in three-dimensional (3D) space and the focus of the player's gaze in two dimensional-space (2D) or 3D space and determining a location of the eye gaze of the player relative to a viewing area of an interactive game environment displayed on the EGM using the player eye gaze data.

A display controller in the EGM may dynamically update the rendering of the viewing area or a portion of the viewing area based on the player eye gaze data.

The gaming enhancements described herein may be carried out using a physical EGM that may be embodied in a variety of forms, machines and devices including, for example, portable devices, such as tablets and smart phones, that can access a gaming site or a portal (which may access a plurality of gaming sites) via the Internet or other communication path (e.g., a LAN or WAN), and so on. The EGM may be located in various venues, such as a casino or an arcade.

Electronic Gaming Machines

In various embodiments of the present disclosure, an EGM can provide the enhanced physical player interaction in conjunction with one or more various game components (such as but not limited to game symbols, game cards, game reels, game wheels, game tiles, game dice, game chips, game balls, game selections, game characters, game awards, game outcomes, or other game objects) or other functional aspects or functionality provided by the EGM to or for the player, using a combination of player eye gaze data and three-dimensional image manipulation.

Figure 1B:
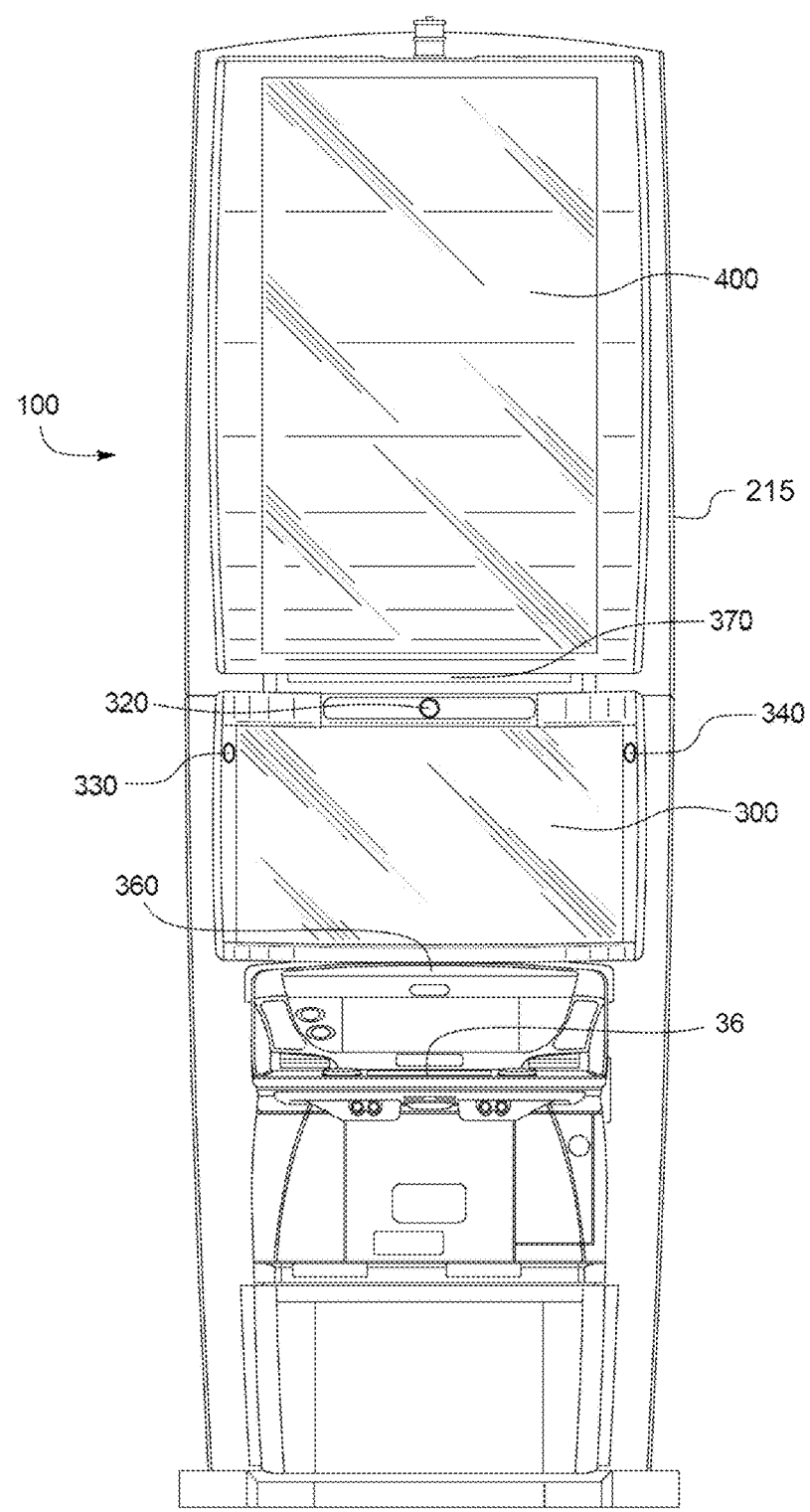
FIG. 1B is a front view of an electronic gaming machine according to further embodiments.
Figure 2:
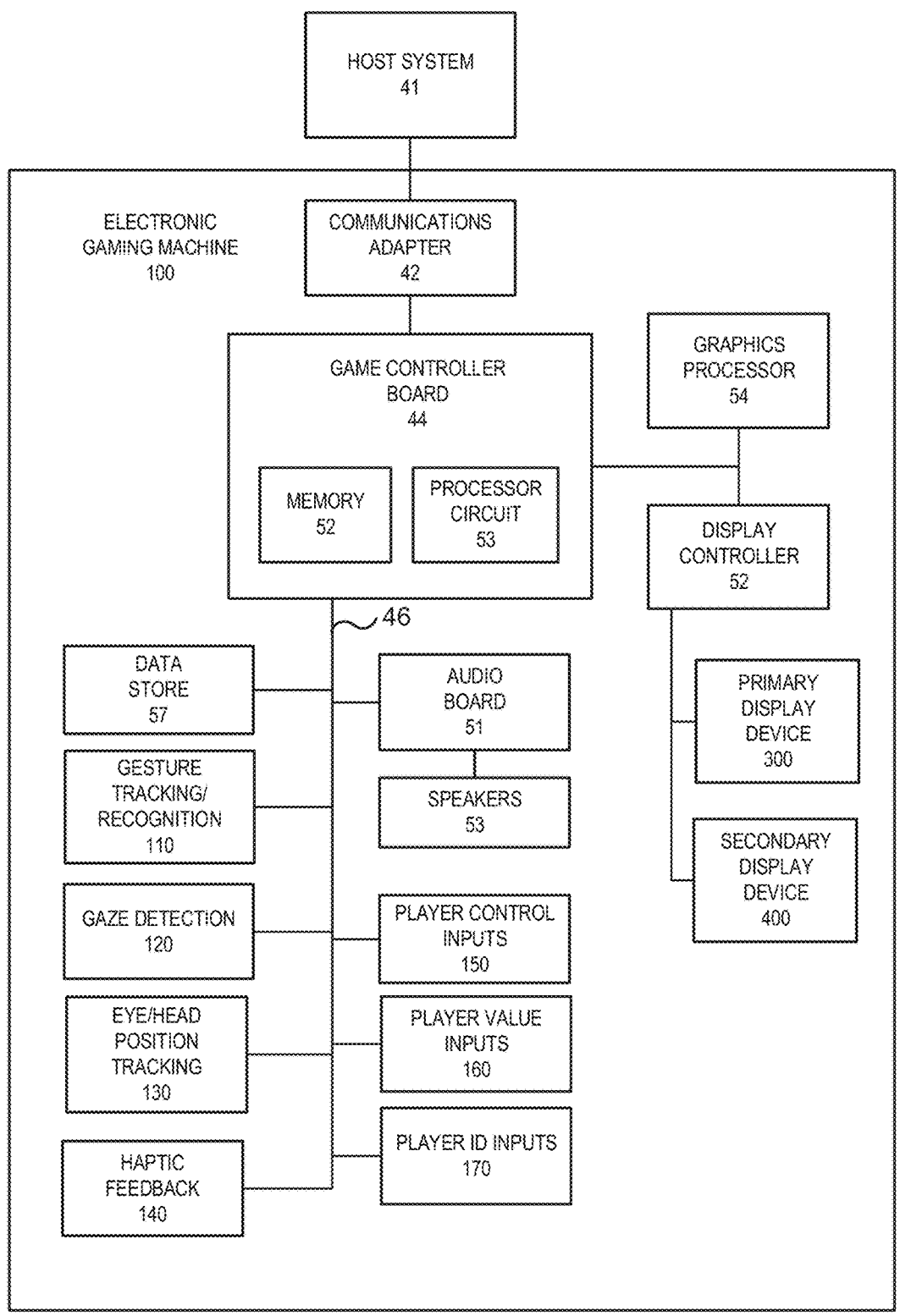
FIG. 2 is a schematic diagram of an electronic gaming machine linked to a casino host system according to some embodiments.

FIG. 1A is a perspective view and FIG. 1B is a front elevation of an EGM 100 that is configured to monitor eye gaze of a player to collect player eye gaze data, and to control the display of three-dimensional game components by the EGM in response to the player eye gaze data in accordance with some embodiments. FIG. 2 is a block diagram illustrating some functional components of the EGM 100.

The example EGM 100 illustrated in FIGS. 1A and 1B generally includes a support structure or cabinet 215 that supports a plurality of output devices and a plurality of input devices of the EGM 100, among other components. The output devices include: a primary display device 300, and a secondary display device 400 positioned above the primary display device 300. A third or lower display device 500 may be positioned below the first or intermediate display device 300. These output devices are configured to display the games, game outcomes, awards (such as the primary and secondary games awards or other game outcome awards), and other functionality and information to the player. In this illustrated example embodiment, the plurality of player input devices enable the player to play one or more wagering games provided by the EGM 100. Such player input devices can also include one or more input devices described below that are physically touchable or activatable by the player to enable the player to make inputs into the EGM 100. These output devices and input devices are configured such that a player may operate the EGM while standing or sitting, but preferably operates the EGM while the player is sitting in front of the EGM 100 such that the player's head is approximately at the same height as the primary display device 300 (as generally shown in FIGS. 4A, 4B, 4C, and 4D).

Referring to FIGS. 1A, 1B and 2, the primary display device 300, which is capable of displaying three-dimensional images to a player, may include a thin film transistor (TFT) display, a liquid crystal display (LCD), a cathode ray tube (CRT), autostereoscopic 3D display, an LED display, an OLED display, or any other type of display. The secondary display device 400 may be configured to display additional game content, non-game content, promotional content, or other content in addition to content displayed on the primary display device 300. The secondary display device 400 may have 2D display capabilities, 3D display capabilities, or both. The secondary display device 400 may provide static information, such as an advertisement for the game, the rules of the game, pay tables, pay lines, or other information, or may even display the main game or a bonus game along with the primary display device 300. Alternatively, the area for the secondary display device 400 may be a display glass for conveying information about the game. The primary display device 300 may also include a camera, sensor, and other hardware input devices. The display devices 300, 400 may display at least a portion of the visible game components of a plurality of interactive games.

In some embodiments, the primary display device 300 may be a touch sensitive display device. The player may interact with the primary display device 300 using touch control such as, but not limited to, touch, hold, swipe, and multi-touch controls. The player may use these interactions to manipulate the interactive game environment for easier viewing or preference, to manipulate game elements such as visible game components, or to select at least a portion of the visible game components depending on the design of the game. For example, the player may select one or more visible game components displayed by the primary display device 300. As another example, the player may not have to touch the primary display device 300 to play the interactive game. The player may instead interact with the interactive game using their eye gaze, eye gestures, and/or body movements, as described in more detail below.

The primary display device 300 may have a touch screen lamination that includes a transparent grid of conductors. Touching the screen may change the capacitance between the conductors, and thereby the X-Y location of the touch may be determined. The X-Y location of the touch may be mapped to positions of interest to detect selection thereof, for example, the game components of the interactive game. A game processor of the EGM 100 associates this X-Y location with a function to be performed. Such touch screens may be used for slot machines, for example, or other types of gaming machines. There may be an upper and lower multi-touch screen in accordance with some embodiments. One or both of display devices 300, 400 may be configured to have auto stereoscopic 3D functionality to provide 3D enhancements to the interactive game environment. The touch location positions may be 3D, for example, and mapped to at least one visible game component of the plurality of visible game components.

The EGM 100 may include a physical device for receiving and accepting value from a player, such as a coin, bill, token, printed ticket, magnetic card, or other token of value in return for which the player is granted credits on the EGM 100. For example, a ticket acceptor 24 includes an input slot that receives machine readable printed tickets and outputs printed tickets for use in cashless gaming. A bill acceptor 26 receives and validates paper money deposited by the player.

A coin tray (not shown) may receive coins or tokens from a hopper upon a win or upon the player cashing out. However, the EGM 100 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

In some embodiments, the EGM 100 may include a scanner for scanning a barcode indicative of a cryptocurrency address, such as a bitcoin, litecoin or ethereum address, to permit the EGM 100 to transfer credits to a player in the form of a cryptocurrency.

A card reader 34 may read from various types of cards, such as smart cards, magnetic strip cards, or other types of cards conveying machine readable information. The card reader reads the inserted card for player and credit information for cashless gaming. The card reader 34 may read a magnetic code on a conventional player tracking card, where the code uniquely identifies the player to a host system at the venue. The code is cross-referenced by the host system to any data related to the player, and such data may affect the games offered to the player by the gaming terminal. The card reader 34 may also include an optical reader and printer for reading and printing coded barcodes and other information on a paper ticket. A card may also include credentials that enable the host system to access one or more accounts associated with a user. The account may be debited based on wagers by a user and credited based on a win.

The card reader 34 may be implemented in different ways for various embodiments. The card reader 34 may be an electronic reading device such as a player tracking card reader, a ticket reader, a banknote detector, a coin detector, or any other input device that can read an instrument supplied by the player for conveying a monetary amount. In the case of a tracking card, the card reader 34 detects the player's stored bank and applies that to the gaming machine being played. The card reader 34 or reading device may be an optical reader, a magnetic reader, or other type of reader. The card reader 34 may have a slot provided in the gaming machine for receiving the instrument. The card reader 34 may also have a communication interface (or control or connect to a communication interface) to digitally transfer tokens or indicia of credits or money via various methods such as RFID, tap, smart card, credit card, loyalty card, NFC and so on.

An electronic device may couple (by way of a wired or wireless connection) to the EGM 100 to transfer electronic data signals for player credits and the like. For example, near field communication (NFC) may be used to couple to EGM 100 which may be configured with NFC enabled hardware. This is a non-limiting example of a communication technique.

A touchpad 36 may accept player input, such as a personal identification number (PIN) or any other player information. The touchpad 36 may display a menu for instructions and other information and provides visual feedback of the keys pressed.

The EGM 100 may include a plurality of player control buttons 39 that include any buttons or other controllers needed to play the particular game or games offered by EGM 100 including, for example, a bet button, a repeat bet button, a spin reels (or play) button, a maximum bet button, a cash-out button, a display pay lines button, a display payout tables button, select icon buttons, and any other suitable button. The player control buttons 39 may in some embodiments be implemented as virtual buttons on a touch screen display.

The player control buttons 39 may be provided on the touchpad 36 or another digital button panel that may include various elements such as for example, a touch display, animated buttons, frame lights, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on. The digital button panel may receive player interaction commands, in some example embodiments.

The EGM 100 may include an output device, such as one or more speakers 53. The speakers may be located in various locations on the EGM 100 such as in a lower portion or upper portion. The EGM 100 may have a chair or seat portion and the speakers may be included in the seat portion to create a surround sound effect for the player. The seat portion may allow for easy upper body and head movement during play. Functions may be controllable via an on screen game menu. The EGM 100 is configurable to provide full control over all built-in functionality (lights, frame lights, sounds, and so on).

Referring to FIG. 2, the EGM 100 is shown linked to the casino's host system 41 via network infrastructure.

The EGM 100 includes a data storage device 57 that stores game data for one or more three-dimensional interactive games. The data storage device 57 may store game data for one or more primary interactive games and one or more bonus interactive games. The EGM 100 includes a display controller 52 that detects a control command from a game controller 44 of the EGM and responsive to such command may dynamically update the rendering of the viewing area.

A communications adapter 42 may contain circuitry for coupling the EGM 100 to network. The communications adapter 42 may include a network interface allowing EGM 100 to communicate with other components, to access and connect to network resources, to serve an application, to access other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including any combination of these. The EGM 100 may communicate over a network using a suitable protocol, such as the G2S protocols.

The communications adapter 42 may communicate, transmit and receive data using a wireless transmitter, or it may be wired to a network, such as a local area network running throughout the casino floor, for example. The communications adapter 42 may set up a communication link with a master controller and may buffer data between the network and a game controller board 44. The communications adapter 42 may also communicate with a network server, such as in accordance with the G2S standard, for exchanging information to carry out embodiments described herein.

The game controller board 44 includes a memory 52 and a processor circuit 53 for carrying out program instructions stored in the memory and for providing the information requested by the network. Game data for one or more game programs may be stored in the memory 52. In addition, program modules for operating various subsystems of the EGM may be stored in the memory 52. The processor circuit 53 may be a multi-core processor including two or more independent processing units. Each of the cores in the processor circuit 53 may support multi-threading operations, i.e., may have the capability to execute multiple processes or threads concurrently. Additionally, the processor circuit 53 may have an on-board memory cache. An example of a suitable multi-core, multithreaded processor circuit is an Intel® Core i7-7920HQ processor, which has four cores that support eight threads each and has an 8 MB on-board cache. The game controller board 44 executes game routines using game data stores in a data store 57 accessible to the game controller board 44, and cooperates with a graphics processor 54 and a display controller 52 to provide games with enhanced interactive game components. The graphics processor 54 may have an integrated high-speed dedicated graphics memory.

Peripheral devices/boards in the EGM 100 may communicate with the game controller board 44 via a bus 46 using, for example, an RS-232 interface. Such peripherals may include player value input devices 160, which may include a bill acceptor 26, a coin acceptor 22, and a smart card reader or other type of credit card reader 34, and player control inputs 150 (such as buttons or a touch screen). The EGM may further include one or more player identification input devices, such as a card reader for reading a player loyalty card, a biometric input, keypad, or other input device that allows the player to identify him or herself/

The player control inputs 150 may include the keypad, the buttons, touchscreen display, gesture tracking hardware, and data capture device as described herein. Other peripherals may be one or more cameras used for collecting player input data, or other player movement or gesture data that may be used to trigger player interaction commands. The display device 300 may be a touch sensitive display device. The player control inputs 150 may be integrated with the display device 300 to detect player interaction input at the display device 300.

The game controller board 44 may also control one or more devices that produce the game output including audio and video output associated with a particular game that is presented to the user. For example, an audio board 51 may convert coded signals into analog signals for driving speakers.

The game controller board 44 may be coupled to an electronic data store storing game data for one or more interactive games. The game data may be for a primary interactive game and/or a bonus interactive game. The game data may, for example, include a set of game instructions for each of the one or more interactive games. The electronic data store may reside in a data storage device, e.g., a hard disk drive, a solid state drive, or the like. Such a data storage device may be included in EGM 100, or may reside at the host system 41. In some embodiments, the electronic data store storing game data may reside in the cloud.

The graphics processor 54 may be configured to generate and render animation game enhancements based on game data as directed by the game controller board 44. The game enhancements may involve an interactive game environment that may provide one or more game components and graphical animation effects. The graphics processor 54 may be a specialized electronic circuit designed for image processing (including 2D and 3D image processing in some examples) in order to manipulate and transform data stored in memory to accelerate the creation of images in a frame buffer for output to the display by way of the display controller 52. The graphics processor 54 may redraw various game enhancements as they dynamically update. The graphics processor 54 may cooperate with game controller board 44 and display controller 52 to generate and render enhancements as described herein. The graphics processor 54 may generate an interactive game environment that may provide one or more game components, for example, a 3D reel space of a plurality of game components. The graphics processor 54 may generate graphical animation effects to represent a visual update to the game components in the viewing area, the visual update based on the player eye gaze data, player eye gesture data, player movement data, or any combination thereof.

The display controller 52 may require a high data transfer rate and may convert coded signals to pixel signals for the display. The display controller 52 and the audio board 51 may be directly connected to parallel ports on the game controller board 44. The electronics on the various boards may be combined onto a single board. The display controller 52 may control output to one or more display device 300 (e.g. an electronic touch sensitive display device). The display controller 52 may cooperate with graphics processor 54 to render animation enhancements on the display device 300.

The display controller 52 may be configured to interact with graphics processor 54 to control the display device 300 to display a viewing area defining the interactive game environment including navigation to different views of the interactive game environment. Player control inputs 50 and the data capture camera device 25 may continuously detect player interaction commands to interact with interactive game environment. For example, the player may move a game component to a preferred position, select a game component, or manipulate the display of the game components.

The EGM 100 further includes functional units for performing various features described herein, including a gesture recognition unit 110, a gaze detection unit 120, an eye/head position tracking unit 130 and a haptic feedback unit 140, which are described in more detail below. Each of the functional units 110, 120, 130 and 140 may include a processing circuits, including signal processing units, and memory and/or storage that is separate from the processor circuit 53, memory 52 and/or data store 57 of the EGM 100, or may utilize resources of the game controller board including the processor circuit 53, memory 52 and/or data store 57 of the EGM 100.

Three Dimensional Display Capability and Head Position Tracking

As described herein, the EGM 100 may be configured to provide an interactive game environment that displays three-dimensional interactive game content to a player. The interactive game environment may provide a plurality of game components or game symbols based on the game data. The game data may relate to a primary interactive game or a bonus interactive game, or both. For example, the interactive game environment may comprise a 3D reel space that may have an active primary game matrix of a primary subset of game components. The bonus subset of game components may be different from the primary subset of game components. The player may view a viewing area of the interactive game environment, which may be a subset of the interactive game environment, on the display device 300. The interactive game environment or the viewing area may be dynamically updated based on the eye gaze, eye gesture, or movement of the player as described in more detail below.

The update to the interactive game environment or the viewing area may be a graphical animation effect displayed on the display device 300. The update to the interactive game environment or the viewing area may be triggered based on the eye gaze, eye gesture, or movement of the player. For example, the update may be triggered by looking at a particular part of the viewing area for a pre-determined period of time, or looking at different parts of the viewing area in a pre-determined sequence, or widening or narrowing the eyes. The interactive game environment may be updated dynamically and revealed by dynamic triggers from game content of the primary interactive game in response to electronic data signals collected and processed by EGM 100.

In some embodiments, the EGM 100 may include a display device 300 with autostereoscopic 3D functionality. An autostereoscopic 3D display projects a three-dimensional image to a viewer. The three-dimensional image can be perceived by the viewer without the need for the viewer to use special glasses, such as three-dimensional viewing glasses or a three-dimensional viewing headset. Autostereoscopic displays operate by projecting different images to the viewer's left and right eyes. The two images are synthesized by the viewer into a single three-dimensional image. Separate images may be projected to the viewer's left and right eyes, for example, by locating the viewer's head in three-dimensional space and projecting the left and right images to the player using one or more lenticular lenses.

The lenticular lense(s) cause certain pixels of the screen to be visible only to the player's right eye and certain other pixels of the screen to be visible only to the left eye of the player. When the player's head position is changed, the display device also changes the pixel positions for the left eye and the right eye of the player. The head position or changes thereto determined by an eye/head position tracker are used by the EGM to choose or select the correct pixels for the left eye and the right eye of the player.

It should also be appreciated that other suitable eye tracking or head tracking systems or devices can be employed in accordance with the present disclosure.

In this illustrated example embodiment, the EGM 100 includes a player eye/head position tracking unit 130 that is configured to track the location of the head of the player. The player eye/head position tracking unit 130 includes one or more head tracking cameras such as eye/head position tracking camera 320 supported by the cabinet 215 and positioned directly above the display device 300. The eye/head position tracking camera 320 is configured to track the position of the player's head as they move in front of the display device 300. More specifically, the eye/head position tracking camera 320 is configured to track the position of the player's head as they move in a head tracking zone in front of the EGM 100 such as the head tracking zone 312 shown in front of the EGM 100 in FIG. 4A. The eye/head position tracking unit 130 may also detect an angle and orientation of the player's head. In the embodiments where two or more head tracking cameras are employed, such multiple cameras work together to track the position of the player's head as they move in front of the display device 300. In various embodiments, the cameras are spaced apart by a distance that allows the cameras to view the player's head from positions that differ by a sufficient angle (e.g., 10 degrees) to allow the cameras to capture different views of the player's head from which the position of the player's head can be more accurately estimated. For example, when the player's head is expected to be about 24 inches from the surface of the display 300, the cameras may be spaced apart by at least about 6 inches.

In various embodiments, the processor(s), memory device(s), the player head tracking unit 130, and the display device of the EGM 100 align the coordinate system of a virtual display area (or world) with the real world by using the eye/head position information obtained from the player head tracking unit 130. When the player moves his head around, the display device of the EGM 100 causes the virtual object(s) to appear to the player to stay in place where it is. Therefore, the EGM 100 uses the eye/head position to fix the object(s) in space. The actual 3D stereo projection by the display device changes according to the eye/head position, but to the player, the virtual object(s) may appear or seems to stay where it is.

It should be appreciated that the location of the head tracking zone may vary in accordance with the present disclosure based on the configuration and position of the head tracking camera. It should also be appreciated that more than one head tracking camera may be employed in the EGM in accordance with the present disclosure. It should further be appreciated that the one or more head tracking cameras may be employed in the EGM in different positions adjacent to the display device or elsewhere on the EGM in accordance with the present disclosure.

The display controller 52 may control the display device 300 using the graphics processor 54 to display a viewing area that may include one or more visible game components based on the game data of a plurality of concurrently displayed interactive games.

The display controller 52 may, in response to detection of the control command from the game controller 44 based on the player eye gaze data, player eye gesture data, or player movement data, control display device 300 using the graphics processor 54. The display controller 52 may update the viewing area to trigger a graphical animation effect displayed on one or both of display device 300 representative of a visual update to the visible game components in the viewing area, the visual update based on the player eye gaze data, player eye gesture data, or player movement data.

In some embodiments, the display controller 52 may control the display device 300 using the graphics processor 54 to display the viewing area that may have one or more game components. In response to the detection of the control command based on the player eye gaze data, player eye gesture data, player movement data, or any combination thereof, the display controller 52 may trigger a graphical animation effect to represent a visual update to the game components in the viewing area.

Player Gaze Detection

Referring again to FIGS. 1A and 2, the EGM 100 may include a gaze detection unit 120 including at least one gaze direction tracking camera 325 that is configured to continuously detect and monitor player the gaze direction of a player playing the EGM 100. The gaze direction tracking camera 325 may be a separate device or may be the same device as the camera device 320 used for eye/head position tracking as described above.

Images from the gaze direction tracking camera 325 are transmitted to the gaze detection unit 120 which determines a location of the eye gaze of the player(s) relative to the viewing area using the data provided by the gaze direction tracking camera 325. The gaze detection unit 120 may determine a location of the eye gaze of the player relative to the viewing area using the data provided by the data capture device, and the gaze detection unit 120 may provide player eye gaze data to the game controller 44.

The gaze direction tracking camera 325 may include a single detector configured to capture images of the player or players of the EGM 100 from a single direction or multiple detectors configured to capture images of the player or players from multiple directions. The EGM 100 may be configured to detect the presence and location of multiple players. Accordingly, eye gaze data may be captured for multiple players of an EGM 100. Accordingly, the player eye gaze data may include eye gaze data of multiple players. It will be appreciated that any reference herein to a player in the singular may include multiple players.

In some embodiments, the game controller 44 may cause the display controller 52 to dynamically update the rendering of the viewing area based on the player eye gaze data. The display controller 52 may control the display device 300 using the graphics processor 54 to dynamically update the rendering of the viewing area to provide a graphical animation effect that alters the visible game components in the viewing area based on the player eye gaze data. In some embodiments, the game controller 44 may provide a control command to the display controller 52 based on the eye gaze or eye gesture of the player, or any combination thereof. The eye gaze of the player may be the location on the display device 300 or in the three-dimensional viewing area in front of the display device 300 where the player is looking.

An eye gesture of the player may be made by the player using one or more eyes, such as widening the eyes, narrowing the eyes, blinking, and opening one eye and closing the other.

A winning outcome of the game for provision of an award may be triggered based on the eye gaze or eye gesture of the player. For example, by looking at a game component displayed by the display controller on the display device 300 for a pre-determined period of time, the player may trigger a winning outcome. The award may include credits, free games, mega pot, small pot, progressive pot, and so on.

The gaze detection unit 120 may be used for eye, gesture or motion tracking of player, such as detecting eye movement, eye gestures, player positions and movements, and generating signals defining x, y and z coordinates associated with the player's eye gaze. The EGM 100 may implement eye-tracking recognition technology using cameras, sensors (e.g. optical sensor), data receivers and other electronic hardware to capture various forms of player input. The eye gaze or eye gesture by a player may interact with the interactive game environment or may impact the type of graphical animation effect. Accordingly, the EGM 100 may be configured to capture player eye gaze input, eye gesture input, and movement input as player interaction commands.

In some embodiments, the gaze detection unit 120 may track a position of each eye of a player relative to the display device 300, as well as a direction of focus of the eyes and a point of focus on the display device 300, in real-time or near real-time. The focus direction may be the direction at which the player's line of sight travels or extends from his or her eyes to the display device 300. The focus point may be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises.

All of the above mentioned eye tracking or movement data, as well as the focus direction and focus point, may be examples of, and referred to as, player's eye movements or player movement data.

In some embodiments, the gaze detection unit 120 may monitor the eye gaze and/or eye gesture of two or more people, who may be two or more players of the interactive game, to collect the player eye gaze data and/or player eye gesture data. The player eye gaze data and/or player eye gesture data may be used such that both players may be able to play the interactive game simultaneously. The interactive game may include aspects of both cooperative and competitive play.

As previously described, the gaze detection unit 120 may track a position of a player's eyes relative to display device 300, as well as a focus direction and a focus point on the display device 300 of the player's eyes in real-time or near real-time. The focus direction can be the direction at which the player's line of sight travels or extends from his or her eyes to the display device 300. The focus point may sometimes be referred to as a gaze point and the focus direction may sometimes be referred to as a gaze direction. In one example, the focus direction and focus point can be determined based on various eye tracking data such as position(s) of a player's eyes, a position of his or her head, position(s) and size(s) of the pupils, corneal reflection data, and/or size(s) of the irises.

In addition, a focus point may extend to or encompass different visual fields visible to the player. For example, a foveal area may be a small area surrounding a fixation point on the display device 300 directly connected by a (virtual) line of sight extending from the eyes of a player. This foveal area in the player's vision may generally appear to be in sharp focus and may include one or more game components and the surrounding area. A focus point may include the foveal area immediately adjacent to the fixation point directly connected by the (virtual) line of sight extending from the player's eyes.

Figure 3:
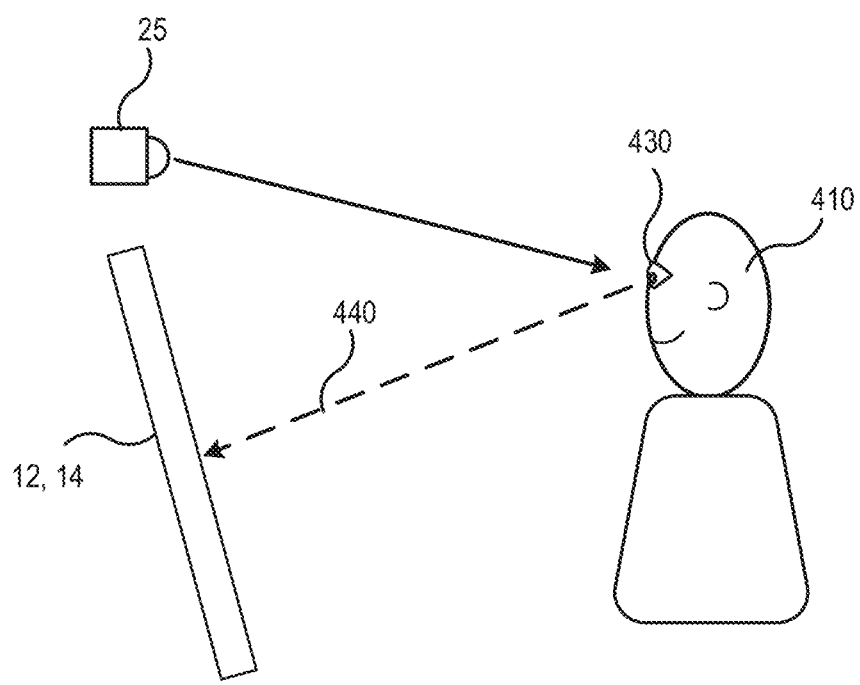
FIG. 3 is a schematic diagram illustrating the mapping of a player's eye gaze to the viewing area according to some embodiments.

Referring to FIG. 3, in some embodiments, the gaze detection unit 120 may determine the location of the eye gaze relative to the viewing area based on the position of the player's eyes relative to the EGM 100 and an angle of the player's eyes. As shown in FIG. 3, the gaze detection unit 120 may use the gaze detection tracking camera 325 to monitor the position of the player's eyes 430 relative to EGM 100, and may also monitor the angle of the player's eyes 430 to collect display mapping data. The angle of the player's eyes may define the focus of the eye gaze, which may be a line of sight relative to the display device 300. Based on the display mapping data, which may include the position of the player's eyes relative to the EGM 100 and an angle of the player's eyes or the line of sight relative, the gaze detection unit 120 may be configured to determine the direction and length of a virtual arrow 440 projecting from the player's eyes 430. The virtual arrow 440 may represent the eye gaze of the player 410. The gaze detection unit 120 and/or the game controller 44 may determine where the virtual arrow 440 intersects with the display device 300. The intersection of the virtual arrow 440 and display device 300 may represent where the eye gaze of the player 410 is focused on the display device 300. The display device 300 may be controlled by display controller 52 to display the viewing area. The gaze detection unit 120 may identify coordinates on the display device 300 corresponding to the player eye gaze data and may map the coordinates to the viewing area to determine the eye gaze of the player relative to the viewing area. The EGM 100 may determine the location of the viewing area that the player 410 is looking at, which may be useful for the EGM 100 to determine how the player 410 is interacting with the interactive game. In some embodiments, the eye gaze of the player may be expressed in 2D or 3D and may be mapped to a 2D surface, such as the surface of the display device 300, or a 3D viewing area, such as the viewing area in front of the primary display device 300.

Contactless Haptic Feedback and Gesture Recognition

Some embodiments may incorporate contactless (i.e., mid-air) haptic feedback to the player in conjunction with a three-dimensional viewing interface and gaze detection to provide a more interactive virtual experience to the player. Accordingly, an EGM 100 according to some embodiments may include a gesture recognition unit 110 including player hand position locator and haptic feedback unit 140 configured to provide tactile feedback to at least one of the player's hands in the player interaction zone based on the determined position of the player's hand. In various embodiments, the EGM 100 may provide one or more plays of primary and/or bonus games (or other functionality) with enhanced physical player interaction. In these embodiments, the EGM 100 can use the player tactile feedback provider to produce one or more sensations in the player's hand in the player interaction zone at the position of the player's hand determined by the player hand position locator to give the player the sensation that the player is actually touching or feeling or interacting with a physical object in the player interaction zone in front of the player (or otherwise physically interacting with the display device or EGM).

FIGS. 4A, 4B, 4C and 4D illustrate an EGM 100 configured to provide contactless haptic feedback to a player. More specifically, referring to FIGS. 2 and 4A to 4D, the EGM 100 includes a player gesture tracking and recognition unit 110 including cameras positioned to the right and left of the EGM and configured to track or determine one or more positions of at least one of the player's hands in front of the display device, and a haptic feedback unit 140 including ultrasonic transducers or transducer arrays positioned above and below the display device and configured to provide tactile feedback to at least one of the player's hand based on the determined position of one or more of the player's hands. In these embodiments, the EGM 100 can use the ultrasonic transducers or transducer arrays to produce one or more sound waves that cause sensations in the player's hand in the player interaction zone at the position of the player's hand determined by the cameras positioned to the right and left of the display device on a real time or substantially real time basis to give the player the physical sensation that the player is actually touching or feeling or interacting with a physical object in the player interaction zone in front of the player (or otherwise physically interacting with the display device).

It should be appreciated that the first display device, the player eye/head position tracking unit 130, the gesture tracking/recognition unit 110, and the haptic feedback unit 140, may each be individually configured or may alternatively be configured to operate with the one or more processors and memory devices to provide each of their designated functions described herein. In other words, the first display device may be individually configured to display 3D or may be configured to operate with the one or more processors and memory devices to display the 3D images. The player eye/head position tracking unit 130 may be individually configured to track the movement of the eyes and/or head of the player or may be configured to operate with the one or more processors and memory devices to track the movement of the eyes and/or head of the player.

The gesture tracking/recognition unit 110 may individually be configured to track the position of at least one of the player's hands or may be configured to operate with the one or more processors and memory devices to track the position of at least one of the player's hands, and the haptic feedback unit 140 may be individually configured to provide tactile feedback to at least one of the player's hands or may be configured to operate with one or more processors and memory devices to provide tactile feedback to at least one of the player's hands.

In some embodiments, the EGM 100 may be configured to provide the enhanced physical player interaction of the present disclosure by operating on a real time or substantially real time basis to: (a) cause the first display device 300 to display 3D images such that the player in front of the first display can see one or more virtual objects in a player interaction zone in front of the first display device or projecting toward the player; (b) determine movements of the player's eyes or head and cause the first display device to vary the display relating to the virtual object(s) in the player interaction zone based on such player eye or head movements; (c) determine the positions of one or more of the player's hands positioned in the player interaction zone in front of the display device; (d) determine or estimate the position(s) of the player's hand(s) relative to the apparent positions of the virtual objects displayed in the player interaction zone; and (e) enable the player to interact with the virtual objects in the player interaction zone in part by changing the display of the objects based on the position(s) of the player's hand(s) and in part based on causing a physical interaction with the player's hand(s) to occur in the player interaction zone at the position(s) of the virtual object(s), thus giving the player a sense that the player actually touched one or more of the virtual objects as if the virtual object(s) were physical objects floating in the player interaction zone.

In various embodiments, this physical interaction is provided by one or more choreographed haptic events that the player can physically feel or sense on an anatomical feature of the player, such as the player's hand(s) or finger(s). In various embodiments, the choreographed haptic event(s) include one or more sound waves directed at the player's hand(s) or finger(s) that provide the player a feeling or sensation that the player is actually touching the virtual object in the player interaction zone or otherwise interacting with the EGM without actually touching the EGM.

In various embodiments, primary display device 300 is configured to display or project what appears to the player as one or more 3D virtual objects that are projected towards the player or projected in the player interaction zone (such as the player interaction zone 310 shown in FIG. 4B) in front of the player 410. In various embodiments, the primary display device 300 is configured to display or project what appears to the player as one or more 3D virtual objects that appear to the player to be behind the front face or screen of the primary display device 300.

In some embodiments, the player interaction zone 310 extends in front of the display device 300 in a cone-like shape. However, it should be appreciated that in other embodiments, the player interaction zone can be alternatively configured, such as to extend: (a) from a horizontal plane level with a top edge of the display device to a horizontal plane level with a bottom edge of the display device; (b) from a vertical plane level with a right side edge of the display device to a vertical plane level with a left side edge of the display device; and (c) from a vertical plane from a front face of the display device to a vertical plane approximately twelve inches from the front surface of the display device. In other embodiments, the player interaction zone can be alternatively configured to extend: (a) from a horizontal plane level with the top edge of the display device to a horizontal plane level with the bottom edge of the display device; (b) from a vertical plane level with the right side edge of the display device to a vertical plane level with the left side edge of the display device; and (c) from a vertical plane from the front face of the display device to vertical plane approximately twelve inches from the front surface of the display device. It should thus be appreciated that the size and shape of the player interaction zone may vary according to design requirements.

It should also be appreciated that the size and shape of the player interaction zone may vary as the position of the player's eyes or head change in accordance with the present disclosure. In certain such embodiments, the far end of the cone is centered at the player's eyes or head, and when the player's eyes or head move, the player interaction zone changes.

It should also be appreciated that other suitable 3D or virtual object displaying systems or devices can be employed in accordance with the present disclosure.

The primary display device 300, the eye/head position tracking camera 320, the one or more processor(s), and the one or more memory device(s) operate to track the player's head movements in the eye/head tracking zone 312 in relation to the first display device 300 and the player interaction zone 310 and to adjust the display or projection of each of the virtual object(s) in the player interaction zone 310 based on the player's eye or head movements. In various embodiments, the primary display device 300 adjusts the images to be seen by the player's left and right eyes based on the determined position and movement of the player's eyes or head.

Figure 4A:
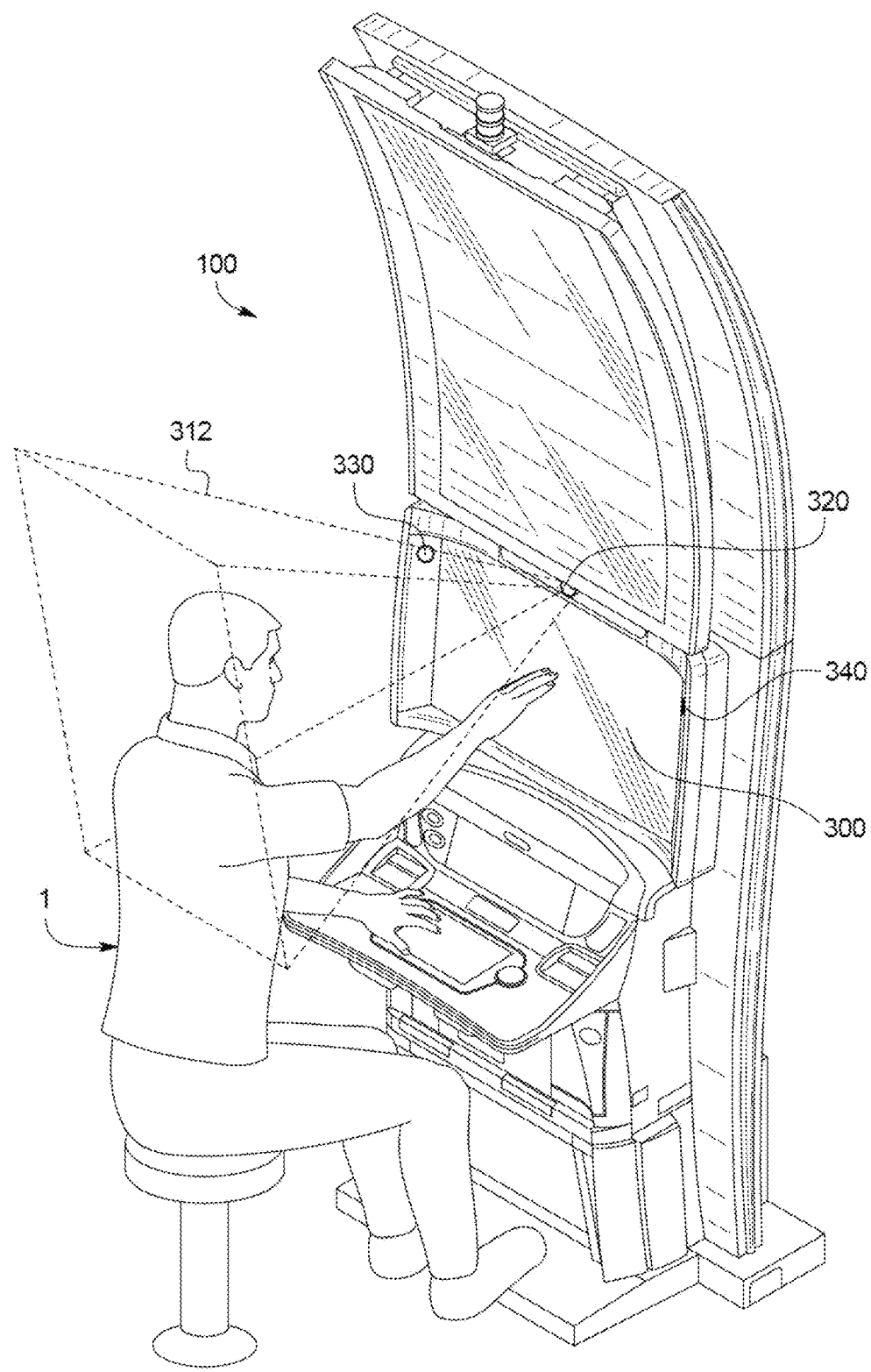
FIG. 4A is a front perspective view of the EGM of FIG. 1A, showing in phantom a player eye or head tracking zone provided by the EGM.
Figure 4B:
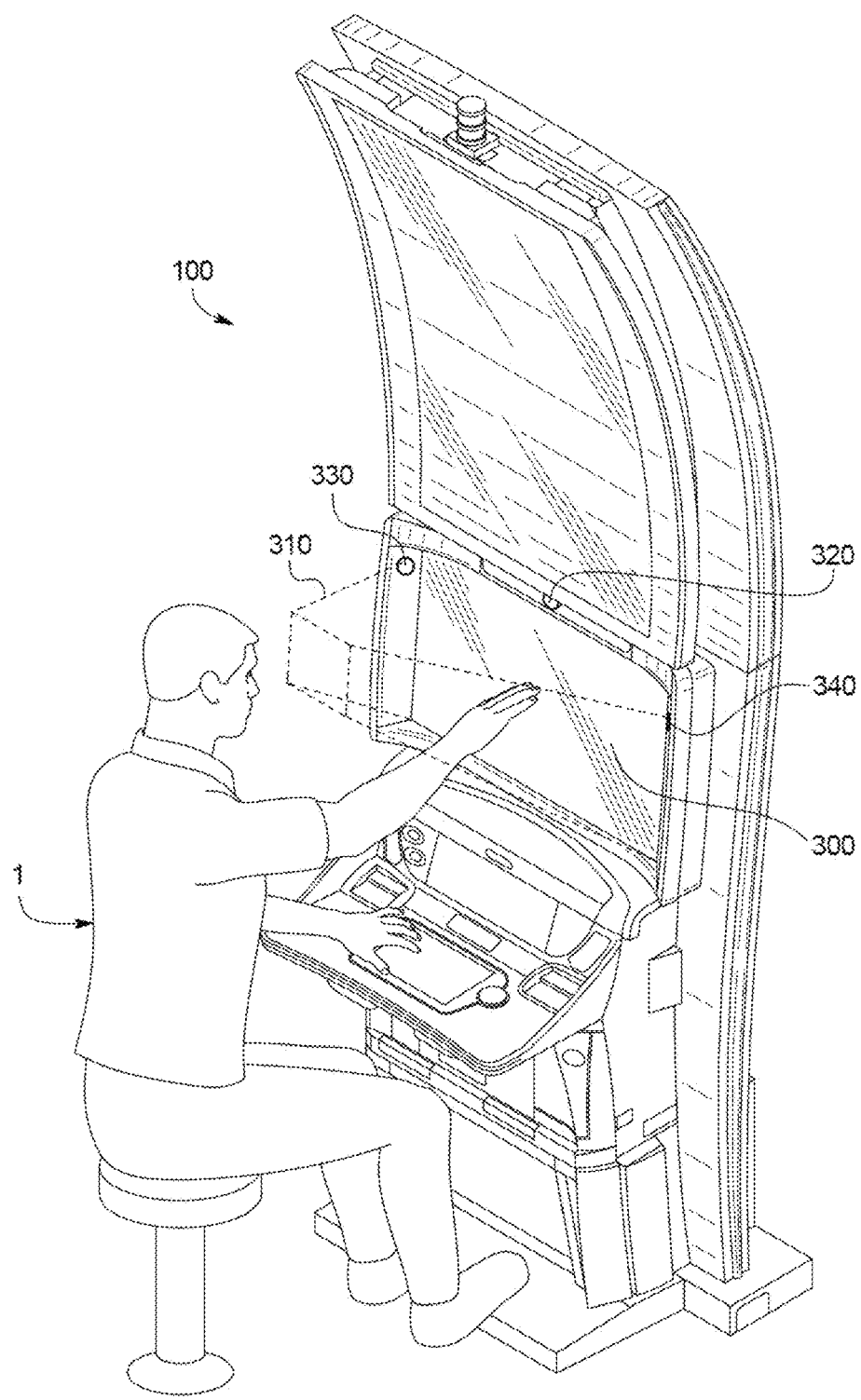
FIG. 4B is a front perspective view of the EGM of FIG. 1A, showing in phantom a player interactive zone provided by the EGM.
Figure 4C:
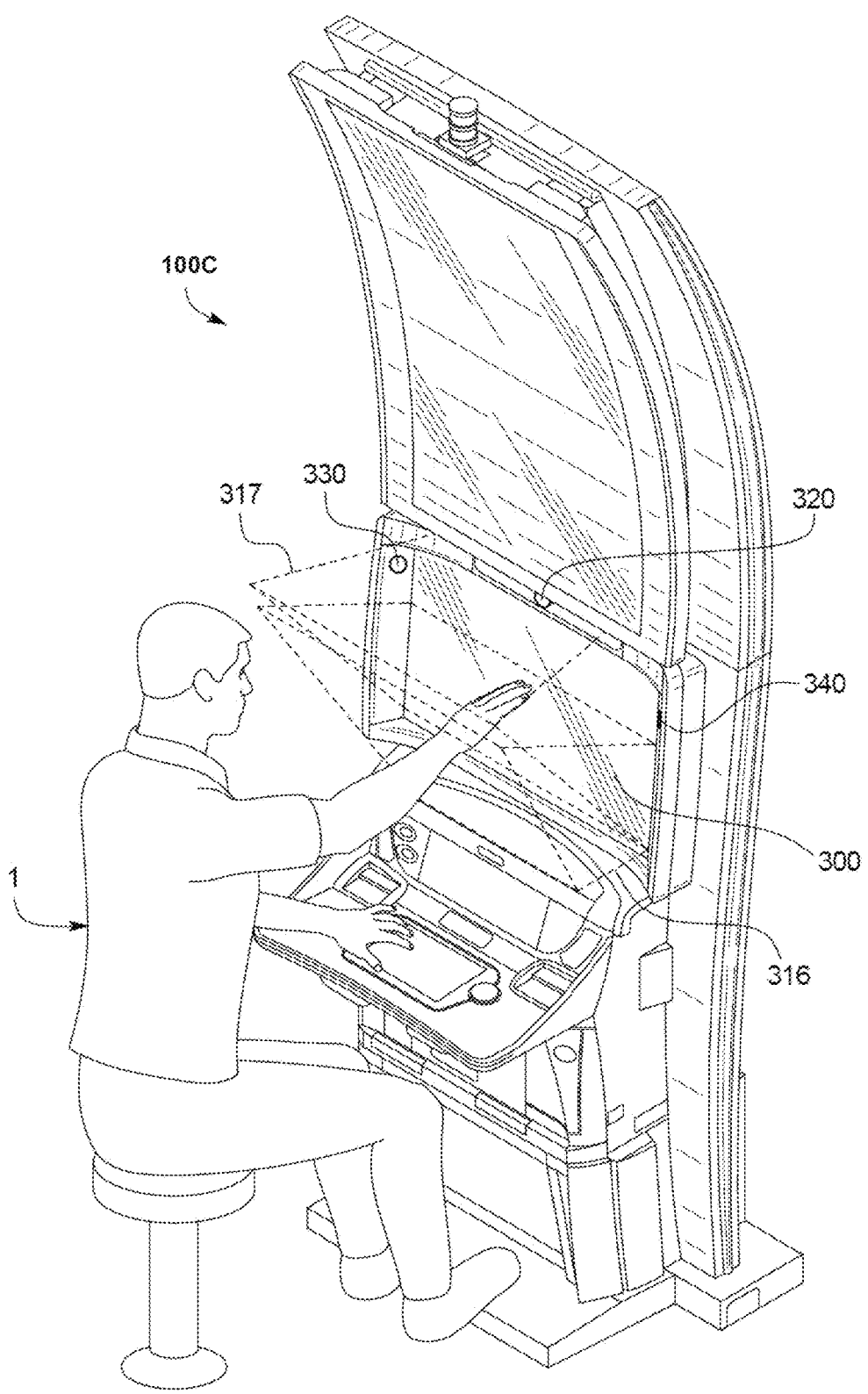
FIG. 4C is a front perspective view of the EGM of FIG. 1A, showing in phantom upper and lower player haptic or sensation zones provided by the EGM.
Figure 4D:
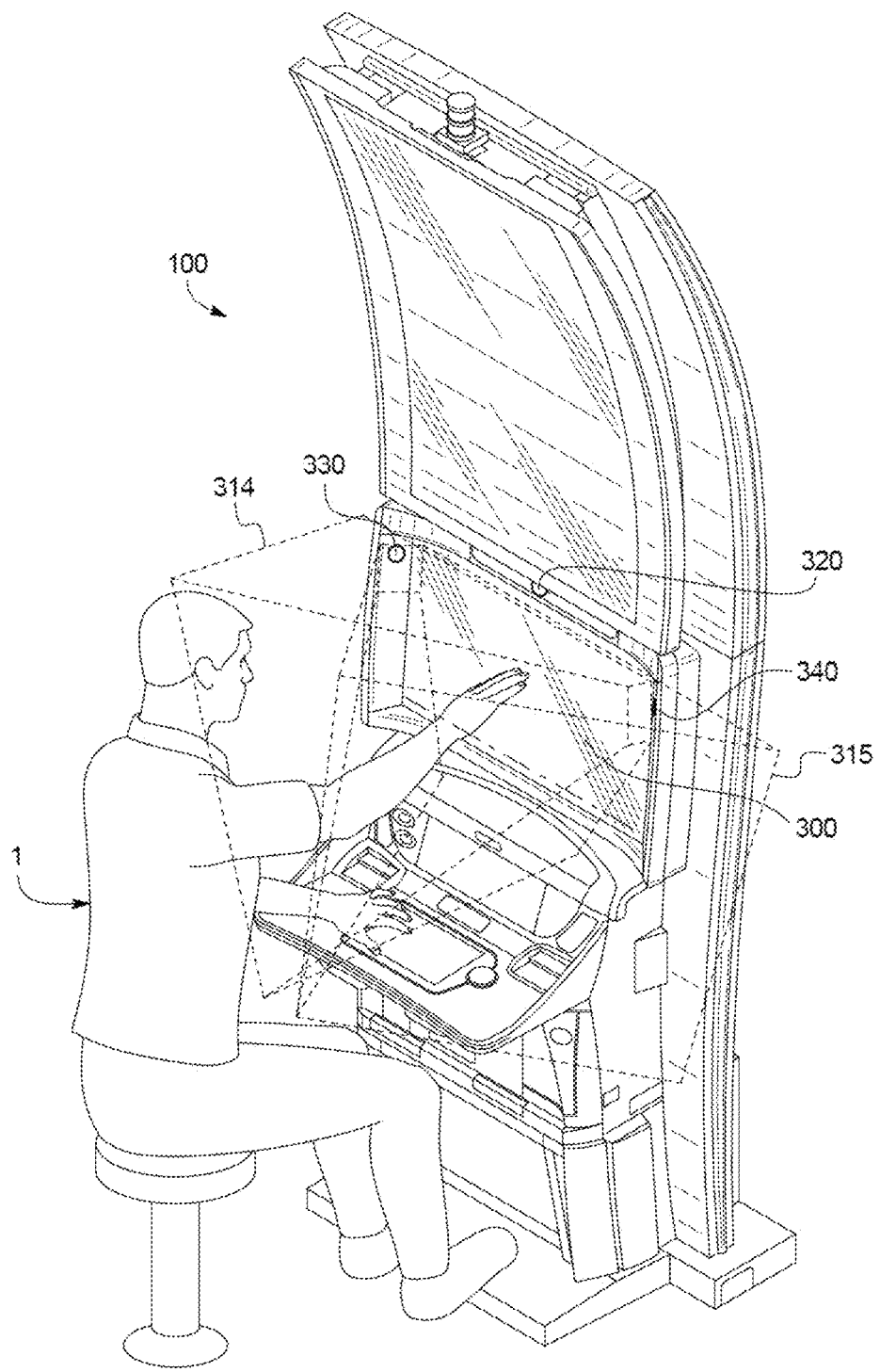
FIG. 4D is a front perspective view of the EGM of FIG. 1A, showing in phantom left and right player hand location zones provided by the EGM.

It should also be appreciated from the above and from FIG. 4B that in certain embodiments of the present disclosure, the player's head (and eyes) are expected to be outside of the player interaction zone 310.

In this illustrated example embodiment, the player gesture tracking/recognition unit 110 of the EGM 100 that is configured to track or determine the position(s) of at least one of the player's hands in front of the first display device 300 in the right and left player hand tracking zones 314 and 315 (shown in FIG. 4D) includes a plurality of cameras 330 and 340 supported by the cabinet 215 and positioned adjacent to the first display device 100. In this illustrated embodiment, one camera 330 is positioned directly to the right of the display device 300 (looking forward) and one camera 340 positioned directly to the left of the display device 300 (looking forward). In this illustrated embodiment, the plurality of cameras 330 and 340 are positioned adjacent to an upper right hand corner of the display device 300 and the other of the plurality of camera is positioned adjacent to an upper left hand corner of the display device 300. It should be appreciated that in an alternative embodiment, the plurality of cameras can be positioned adjacent to a lower right hand corner of the display device 300 and positioned adjacent to a lower left hand corner of the display device 300. It should be appreciated that in other alternative embodiments, the plurality of cameras can be otherwise alternatively positioned in accordance with the present disclosure. It should also be appreciated that in other alternative embodiments, the EGM can include only one such camera or more than two such cameras in accordance with the present disclosure. In various embodiments, the player hand position locator is configured to locate part of the player's hand, such as one or more fingers. In various embodiments, the player hand position locator is configured to simultaneously locate both of the player's hands or locate multiple parts of the player's hands, such as two or more fingers.

In various embodiments, the cameras 330 and 340 are or include time of flight depth camera sensors positioned at the two opposite sides of the display device 300 and focused inwardly somewhat towards each other. This configuration enables the cameras 330 and 340 to track objects, such as one or more of the player's hands in the relatively large right and left player hand tracking zones 314 and 315 (shown in FIG. 4D), respectively. These right and left player hand tracking zones 314 and 315 overlap the player interaction zone 310 (shown in FIG. 4B). In various embodiments, the time of flight depth camera sensors make the EGM less prone to occlusions. In various embodiments, the time of flight depth cameras also deliver point clouds that can be quickly analyzed and used by the processor(s) to make the necessary determinations. It should be appreciated that other suitable depth sensors (other than time of flight sensors) may be employed in accordance with the present disclosure.

In various embodiments, the EGM 100 uses the image data provided by the cameras 330 and 340 to determine the position(s) of the player's hand(s) in the right and left player hand tracking zones 314 and 315 and thus also in the player interaction zone 310. In certain embodiments, the EGM 100 creates the object depth images using point clouds provided by time of flight depth cameras and merges these point clouds to create one optimized point cloud that represents the object(s), such as the player's hand(s) in the right and left player hand tracking zones 314 and 315, and thus any portions thereof also in the player interaction zone 310 and relative to the display device 300. This provides a high degree of accuracy and a relatively large coverage area and player interaction zone (then would a one camera system). In these embodiments, the EGM 100 determines the position(s) of the object(s) such as the player's hand(s) in the player interaction zone 310, and uses the determined position(s) for providing the player haptic or tactile feedback to the player in real time or substantially real time.

Using these two cameras and keeping the camera resolution relatively low: (a) facilitates an increased size of the player interaction zone; and (b) reduces the need for high data rates and significant processing time or delays for image analysis that may slow down the EGM and prevent real time or substantially real time physical player feedback or sensation. Using these two cameras also better facilitates the tracking of multiple player hands.

In various other embodiments, the EGM 100 uses the image data provided by the cameras 330 and 340 to determine the closest depth of the end of the player's hand(s) such as the end of one of the player's fingers that is in the player interaction zone 310 closest to the display device 300. In other words, in these alternative embodiments, the EGM determines the nearest point (i.e., the xyz coordinate relative to the display device 300) of the object such as the player's hand to the display device 300, and then uses that point as the reference for providing the tactile feedback to the player in real time or substantially real time.

In various other embodiments, the EGM uses the image data provided by the cameras 330 and 340 to determine movements or gestures by the player's hand(s). In these embodiments, the EGM uses the determined gestures to provide the player tactile feedback to the player in real time or substantially real time.

In certain embodiments, the EGM includes one or more camera sync cables (not shown) that sync the multiple cameras 330 and 340 to enhance the accuracy of the determination of the position(s) of player's hand(s) in the right and left player hand tracking zones 314 and 315 and in the player interaction zone 310. It should be appreciated that the image data from the multiple cameras can be synced in other suitable manners in accordance with the present disclosure.

It should also be appreciated that other suitable player hand position locating systems or devices can be employed in accordance with the present disclosure.

For example, in various embodiments, the player hand position locator actually estimates the hand pose. The pose of the hand is not the position of the hand, but is instead the location and orientation of certain or every bone of the hand. In certain embodiments, the hand pose is determined by determining or specifying the 3D coordinates of a plurality of or every joint of the skeleton hand.

In this illustrated example embodiment, the haptic feedback unit 140 of the EGM 100 that is configured to provide tactile feedback to at least one of the player's hands includes a plurality of ultrasonic transducers or two arrays of ultrasonic transducers 360 and 370 supported by the cabinet 215 and positioned directly below and above the first display device 300, respectively. These ultrasonic transducers or ultrasonic transducer arrays 360 and 370 are configured to selectively produce and direct sound waves into lower and upper haptic zones 316 and 317 shown in FIG. 4C and in the player interaction zone 310 from below and above the first display device 300. The EGM 100 uses the ultrasonic transducers or ultrasonic transducer arrays 360 and 370 to produce and send the directed sound waves into the player interaction zone 310 at the determined position(s) of the player's hand(s) to cause the players' hand(s) to feel or sense one or more pulses or the sound waves produced by such devices on a real time or substantially real time basis.

In various embodiments, the EGM 100 uses the ultrasonic transducers or ultrasonic transducer arrays 360 and 370 to produce and send the directed sound waves into the player interaction zone 310 at the determined position(s) of the player's hand(s) when the player's hand(s) are at the same positions of one or more of the displayed virtual objects in the player interaction zone 310 such that the sound waves reaching the player's hand(s) at the positions provide the player the sensation that the player is actually touching, feeling, or interacting with one or more of the displayed virtual objects as if each such object was an actual physical object floating in the player interaction zone 310 in front of the player. This player sensation can occur when the player interacts with virtual object(s) apparently in midair in the player interaction zone 310. Thus, the EGM 100 can simulate a characteristic of one or more of the virtual objects the player appears to be interacting with. This provides one of the many different enhanced physical player interactions that can be provided by the EGM 100 in accordance with the present disclosure.

In various embodiments, the EGM 100 can cause the ultrasonic transducers or ultrasonic transducer arrays 360 and 370 to individually or jointly produce and send continuous, regular, interrupted, directed, or individual sound waves into the areas of the player interaction zone 310 at the determined positions of the player's hand(s) to cause the players' hand(s) to feel such sound waves. In various embodiments, the EGM 100 can cause the ultrasonic transducers or ultrasonic transducer arrays 360 and 370 to vary the intensity of the sound waves into the areas of the player interaction zone 310 at the determined positions of the player's hand(s) to cause the players' hand(s) to feel different sensations.

The EGM 100 can cause the ultrasonic transducers or ultrasonic transducer arrays 360 and 370 to produce and send such different sound waves or sound wave patterns directed to: (a) the positions in the player interaction zone 310 where the player's hand(s) is closest to the display device 300; (b) the positions in the player interaction zone 310 which are where the entire player's hand(s) are at; (c) the positions in the player interaction zone 310 which are where the player's arm(s) is or are at; or (d) any combination of these positions in the player interaction zone 310.

In various embodiments, at the same time or slightly after the EGM creates the physical interaction with the player's hand(s) in the player interaction zone 310, the EGM can cause the display device 300 to alter the image(s) including the virtual object(s) in the player interaction zone 310. This can be used to show one or more responses of the virtual object(s) or other displayed image(s) to the interaction with the player's hand(s).

Thus, in various embodiments, the EGM 100 captures the player's hand(s) or finger(s) midair location coordinates while performing a movement in the player interaction zone 310 in real-time, provides haptic sensation to the player's hand(s) or finger(s) at these coordinates in the player interaction zone 310 with no or little lag time, and can additionally alter the displayed virtual object(s) in real time.

In various embodiments, the EGM 100 maps one or more of the player's hand(s) into the virtual environment displayed by the primary display device 300 and/or into the player interaction zone 310. In certain such embodiments, the primary display device 300 can display part of one or more of the player's hand(s) on the primary display device 300 or as a virtual object to further enhance the player interaction.

In the illustrated example embodiment of the EGM 100 of the present disclosure shown in FIGS. 1 to 4D, the cameras 330 and 340 of the player hand position locator of the EGM 100 are positioned directly to the right and left of first display device 300, and the ultrasonic transducers or ultrasonic transducer arrays 360 and 370 are positioned directly below and above the first display device 300. It should be appreciated that in an alternative embodiment of the present disclosure, the cameras 330 and 340 of the player hand position locator of the EGM 100 are positioned directly below and above the first display device 300, and the ultrasonic transducers or ultrasonic transducers arrays 360 and 370 are positioned directly to the right and left of the first display device 300. It should further be appreciated that in an alternative embodiment of the present disclosure, the cameras of the player hand position locator of the EGM 100 are positioned directly below and above the first display device, and the ultrasonic transducers or ultrasonic transducer arrays are also positioned directly below and above the first display device. It should further be appreciated that in an alternative embodiment, the cameras of the player hand position locator of the EGM are positioned directly to the right and left of the first display device, and the ultrasonic transducers or ultrasonic transducer arrays are positioned directly to the right and left of the first display device. It should further be appreciated that in alternative embodiments of the present disclosure, the ultrasonic transducers or ultrasonic transducer arrays are positioned directly to the right and left of the first display device and directly above and below the first display device or suitable combinations thereof.

In the illustrated example embodiment, the processor(s) and memory device(s) of the EGM 100 operate together to provide the enhanced physical player interaction with the EGM 100 and incorporate the player's hand(s) into one or more of the games provided by the EGM 100 or other functionality provided by the EGM 100. For example, the displayed or projected virtual object(s) can be part of a game that enables or requires the player to interact with the object(s) as part of the play of the game.

It should be appreciated that the player tactile feedback provider can in alternative embodiments provide feedback to the player's hand(s) outside of the player interaction zone in accordance with the present disclosure, but in certain such embodiments, the player would not see virtual objects outside of such player interaction zone.

It should also be appreciated that certain other suitable player tactile feedback providing systems or devices can be employed in accordance with the present disclosure.

It should be appreciated from the above that in various embodiments, the EGM 100 can provide the enhanced physical player interaction in conjunction with game play or other functionality provided by the EGM to the player. For example, the EGM can provide interaction with: (a) one or more fingertips of the player interacting in midair in the player interaction zone that enables the player to make inputs such as drawing letters, symbols, or other images with controlled sensational feedback; or (b) one hand or two hands of the player interacting in midair in the player interaction zone the player to make inputs such as drawing letters, symbols, or other images with controlled sensational feedback.

In various embodiments, the EGM can provide the enhanced physical player interaction in conjunction with other functionality provided by the EGM to the player. For example, the EGM can display virtual images of a series of drinks in the player interaction zone and enable to player to select one of the virtual images. When the player positions the player's hand at the position of the selected drink, the EGM can use the ultrasonic transducers or ultrasonic transducer arrays to provide feedback or sensation to the player's hand indicating that that drink has been selected by the player.

In various embodiments, the EGM includes one or more audible sound producing devices (such as speakers) that produce sounds that are coordinated with the haptic tactile feedback provided to the player by the EGM to further enhance the physical player interaction in conjunction with game player or other functionality provided by the EGM to the player.

In various embodiments, a sound chair is associated with the EGM and includes one or more audible sound producing devices (such as speakers) that produce sounds that are coordinated with the haptic tactile feedback provided to the player by the EGM to further enhance the physical player interaction in conjunction with game player or other functionality provided by the EGM to the player.

Interaction of Three-Dimensional Display with Gaze Detection

Figure 5A:
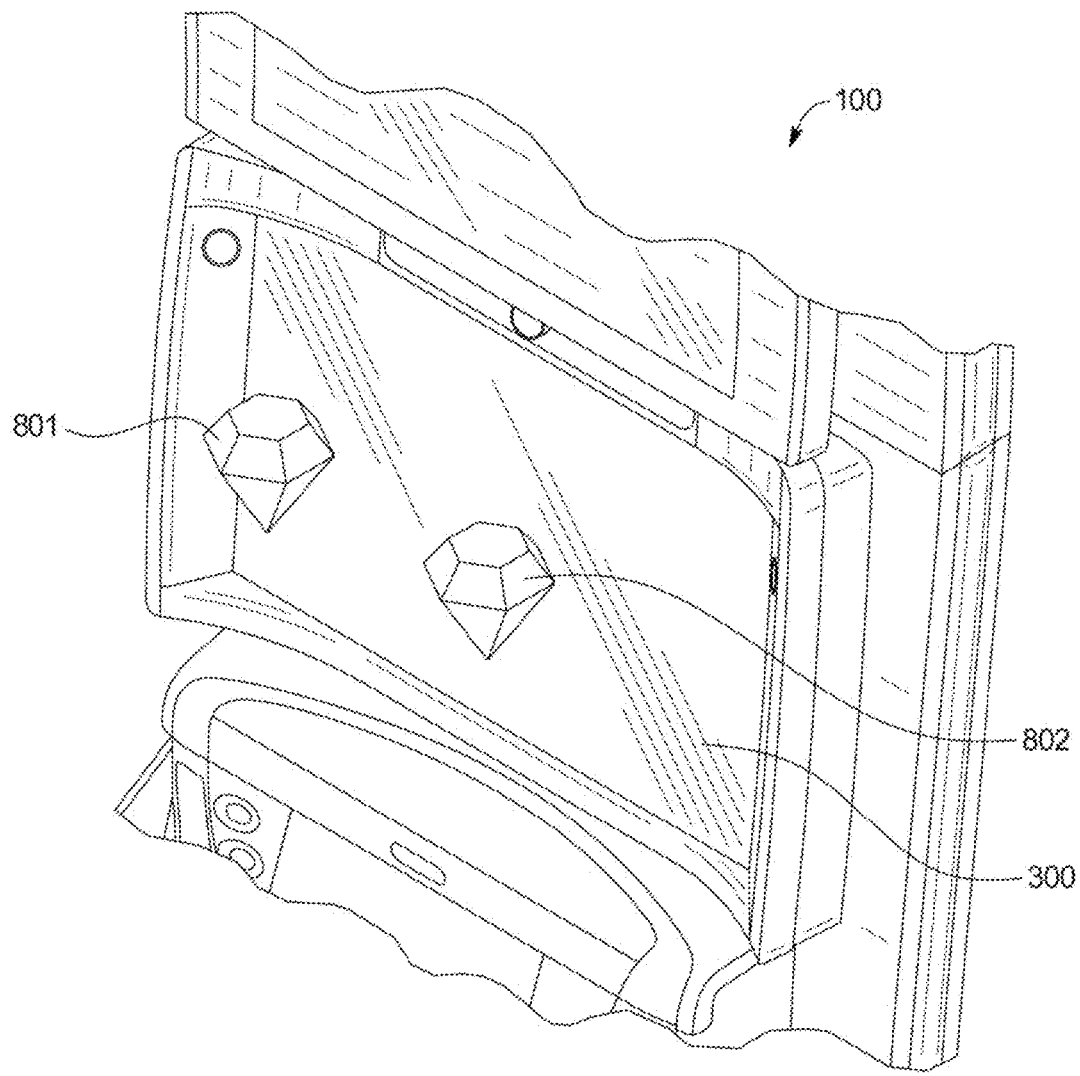
FIG. 5A is an enlarged fragmentary front perspective view of the central portion of the EGM of FIG. 1A.
Figure 5B:
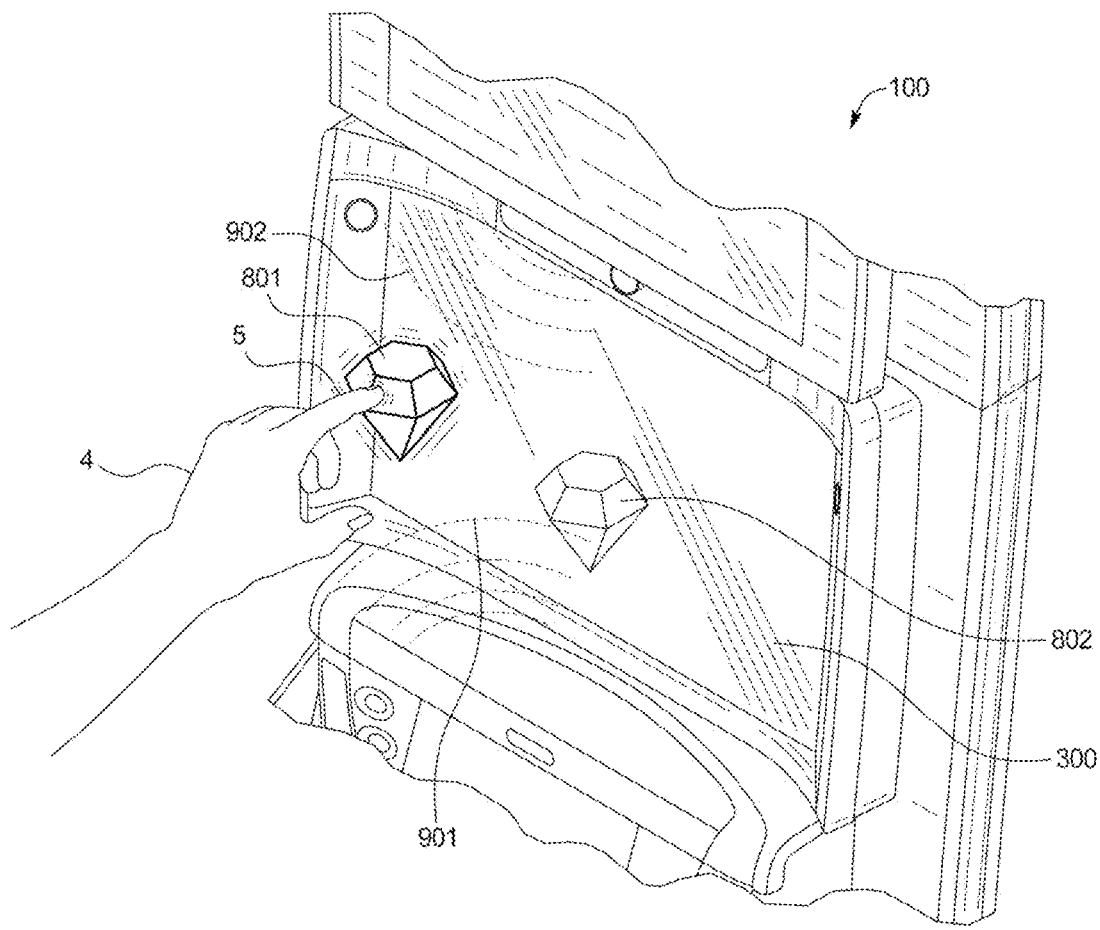
FIG. 5B is an enlarged fragmentary front perspective view of the central portion of the EGM of FIG. 1A.

FIGS. 5A and 5B illustrate an example operation of the EGM 100 according to some embodiments. FIG. 5A shows the EGM 100 displaying, in three dimensions, two player selectable virtual objects 801 and 802 in the player interaction zone in front of the primary display device 300. The virtual objects illustrated in FIGS. 5A and 5B are gems; however, the virtual objects could be any virtual items or game components, such as cards, tiles, reels, etc. It will be appreciated that these objects 801 and 802 are not real, but rather what a player would see looking at the first display device 300.

The virtual objects 801 and 802 are displayed, or rendered, to have apparent three-dimensional positions in space. The three-dimensional positions of the virtual objects 801, 802 may be defined according to the objects' position in a coordinate system, such as a Cartesian coordinate system. In particular, each of the virtual objects 801, 802 may have an associated position vector in a three-dimensional coordinate system.

In some embodiments, the position coordinates of the game component are expressed as Cartesian coordinates, where the first and second coordinates are x- and y-coordinates that are parallel to a display screen of the EGM, and the third coordinate is a z-axis coordinate that is perpendicular to the display screen of the EGM and is directed generally toward the player. In other embodiments, the position coordinates of the game component are expressed as cylindrical coordinates, where the first and second coordinates are r- and $\varphi$-coordinates that are parallel to a display screen of the EGM, and the third coordinate is a z-axis coordinate that is perpendicular to the display screen of the EGM and is directed generally toward the player. In other embodiments, the position coordinates of the game component are expressed as spherical coordinates, where the first and second coordinates are $\theta$- and $\varphi$-coordinates that are parallel to a plane facing the player, and the third coordinate is a $\rho$-axis that is perpendicular to the plane facing the player and is directed generally toward the player.

Each of the virtual objects 801, 802 may be rendered by the primary display device 300 to have a different virtual depth, or apparent distance from the screen or from the player in a direction perpendicular to the screen of the primary display device 300. The apparent depth of a virtual object 801 may be characterized as the apparent position of the object 801 along a z-axis in a Cartesian coordinate system in which the z-axis is perpendicular to a plane corresponding to a viewing screen of the primary display device 300.

In this manner, a scene displayed in three dimensions to the player can include a plurality of objects, or game components, 801, 802, each of which has an associated apparent depth, or z-axis coordinate. To select a virtual object, the player may touch one of the plurality of three-dimensional game components with his or her finger or hand. However, when a number of different virtual objects are being displayed in three-dimensional space by the primary display device 300, it is possible that the player may inadvertently virtually "touch," and thereby inadvertently select, a game component other than the game component that the player intends to touch. This can be highly irritating to the player, especially when the outcome of a game, such as a bonus game or wagering game, is determined based on which game component the player has touched.

Some embodiments coordinate gaze detection with three-dimensional rendering to provide additional feedback to the player that enables a player to select virtual objects with greater confidence and accuracy. Some additional embodiments coordinate gaze detection with three-dimensional rendering and gesture recognition to provide additional feedback to the player. Still further embodiments coordinate gaze detection with three-dimensional rendering, gesture recognition and mid-air haptic feedback to provide additional feedback to the player.

FIG. 5B shows the EGM 100 displaying in three-dimensional space the two virtual objects 801 and 802 in front of the display device 100, a player's hand 4, and in particular a player's finger 5, touching one of the virtual objects 801. When the EGM 100 detects, using the gesture tracking/ recognition unit 110, that the player's hand or finger is located in three-dimensional space where the virtual object 801 is displayed within the player interaction zone 310, the EGM 100 may determine that the player's finger or hand is touching the virtual object 801. The EGM 100 may then activate the haptic feedback function to cause ultrasonic transducer arrays 360 and 370 to generate ultrasonic waves 901, 902 (shown in phantom).

Accordingly, the player's hand 4 may be subject to ultrasonic waves 901 and 902 that cause the player to feel one or more sensations of the player touching the object 801. This is an example of how the EGM 100 can be used to provide a selection game, such as a bonus selection game, where the player selects one or more virtual objects to obtain awards. In various embodiments, the touching of the virtual object may cause the appearance of the virtual object(s) to move or otherwise change as indicated by the lines indicating the movement of object 801 when "touched" by the player finger 5.

In some embodiments, the EGM 100 may, using the position of the player's hand or finger generated by the gesture tracking/recognition unit 110, calculate a distance each of the ultrasonic transducer arrays 360 and 370 to an identified point on the player's hand or finger, such as the player's fingertip. The EGM 100 may control the phase of the ultrasonic sound waves generated by the ultrasonic transducer arrays 360 and 370 so that the sound waves generated by the ultrasonic transducer arrays 360 and 370, respectively, interfere constructively at the identified point on the player's hand or finger to enhance the sensation felt by the player. For example, the gesture tracking/recognition unit 110 may calculate distances from the identified point on the player's hand or finger to center points of each of the ultrasonic transducers in the ultrasonic transducer arrays 360, 370. Selected phase shifts may be applied to the ultrasonic signals transmitted by each of the ultrasonic transducers in the ultrasonic transducer arrays 360, 370 such that peaks of the waveforms transmitted by each of the ultrasonic transducers in the ultrasonic transducer arrays 360, 370 coincide in time at the identified point on the player's hand or finger. Stated differently, selected phase shifts may be applied to the ultrasonic signals transmitted by each of the ultrasonic transducers in the ultrasonic transducer arrays 360, 370 such that the waveforms transmitted by each of the ultrasonic transducers in the ultrasonic transducer arrays 360, 370 interfere constructively at the identified point on the player's hand or finger.

In this sense, the ultrasonic transducer arrays 360, 370 may be controlled to behave as phased array transmitters that increase a gain of ultrasonic waves at a selected location, such as the identified point on the player's hand or finger.

Constructive interference may be useful for causing haptic feedback from the ultrasonic transducer arrays 360, 370 to be felt only at a desired location, such as a player's fingertip. For example, the ultrasonic transducer arrays 360, 370 may be controlled to generate ultrasonic energy that is not, by itself, powerful enough to be felt. However, when ultrasonic signals from multiple ultrasonic transducer arrays are combined constructively, the combined signal may be powerful enough to be felt by the player. This may reduce or prevent the player from feeling haptic feedback from the ultrasonic energy generated by the ultrasonic transducer arrays 360, 370 at places other than where intended, and/or may reduce or prevent the haptic feedback from being felt by persons other than the player.

In some embodiments, this effect may be performed based at least in part on the detected gaze direction of the player. For example, the EGM 100 may cause the haptic feedback unit 140 to control the phase of the ultrasonic sound waves generated by the ultrasonic transducer arrays 360 and 370 so that the sound waves generated by the ultrasonic transducer arrays 360 and 370, respectively, interfere constructively at the point on the player's hand or finger when the EGM 100 detects that the player is looking at a particular virtual object 801, such as a virtual object 801 that the player is "touching" with his or her finger.

In some embodiments, this effect may be performed based at least in part on the detected gaze direction of the player. For example, the EGM 100 may modify the phase of the ultrasonic waves to constructively interfere at a point on the player's finger when the EGM 100 detects that the player is looking at the virtual object 801 that the player is selecting with his or her hand or finger.

In some embodiments, a frequency, intensity, pattern or other aspect of the ultrasonic waves generated by the transducer arrays 360, 370 may be varied based on detecting that the player has not only "touched" a virtual object 801, 802, but also virtually pressed or actuated the object. For example, when the EGM 100 detects that the player has placed his or her hand in the space where the virtual object 801 is rendered, the haptic feedback unit 140 may cause the transducer arrays 360, 370 to generate ultrasonic waves having a first frequency, intensity or pattern. Then, when the EGM 100 detects that the player has selected the virtual object, such as by subsequently moving his or her finger toward the primary display screen in a "pressing" motion, the EGM 100 may cause the haptic feedback unit 140 to cause the transducer arrays 360, 370 to generate ultrasonic waves having a second frequency, intensity or pattern that is different from the first frequency, intensity or pattern. This may provide tactical feedback to the player to confirm that he or she has selected the virtual object 801.

In some embodiments, this effect may be performed based at least in part on the detected gaze direction of the player. For example, the EGM 100 may cause the haptic feedback unit 140 to modify the frequency, intensity or pattern of the ultrasonic waves when the EGM 100 detects that the player is looking at the virtual object 801 that the player is selecting with his or her hand or finger.

Figure 6A:
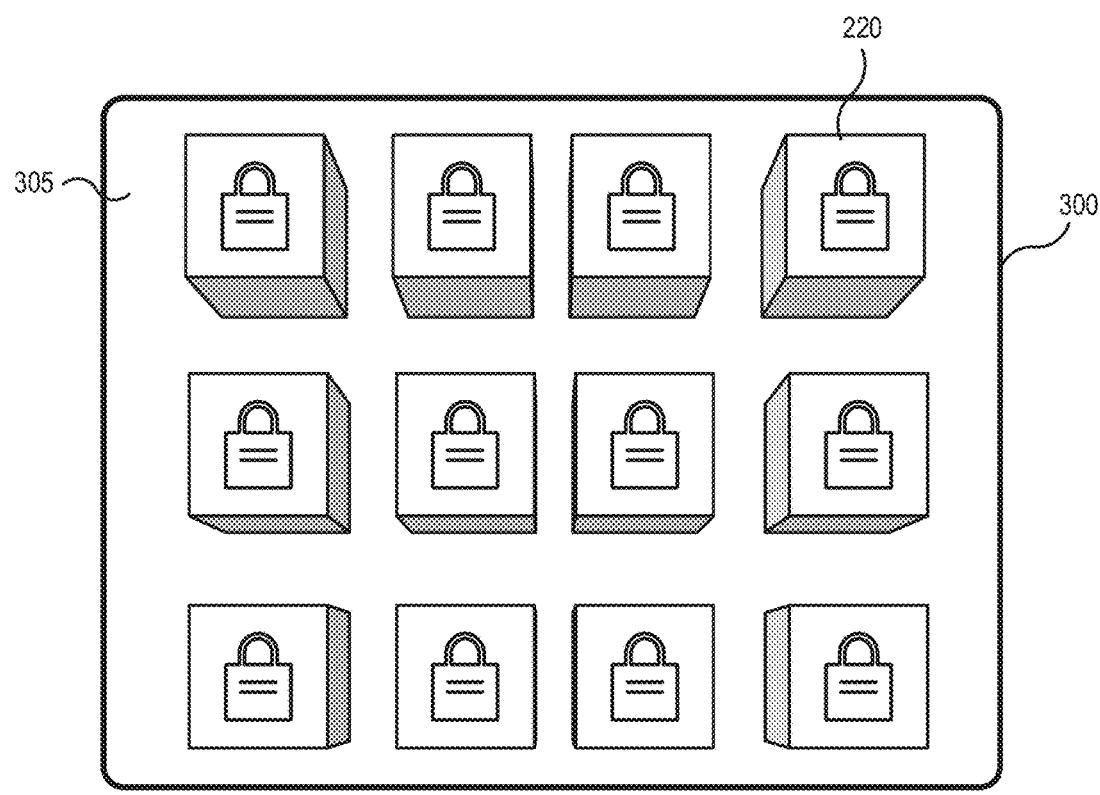
FIGS. 6A, 6B, 6C and 6D are front views of a display screen of the EGM of FIG. 1A displaying a plurality of three-dimensional game components.
Figure 6B:
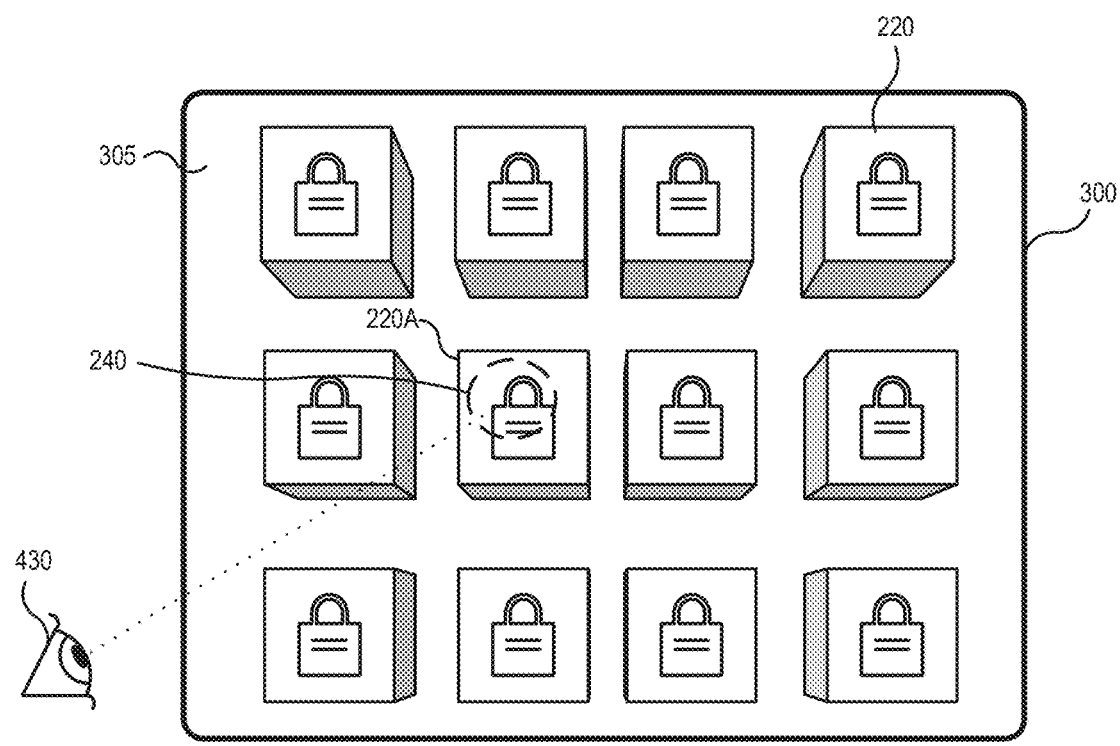
Figure 6C:
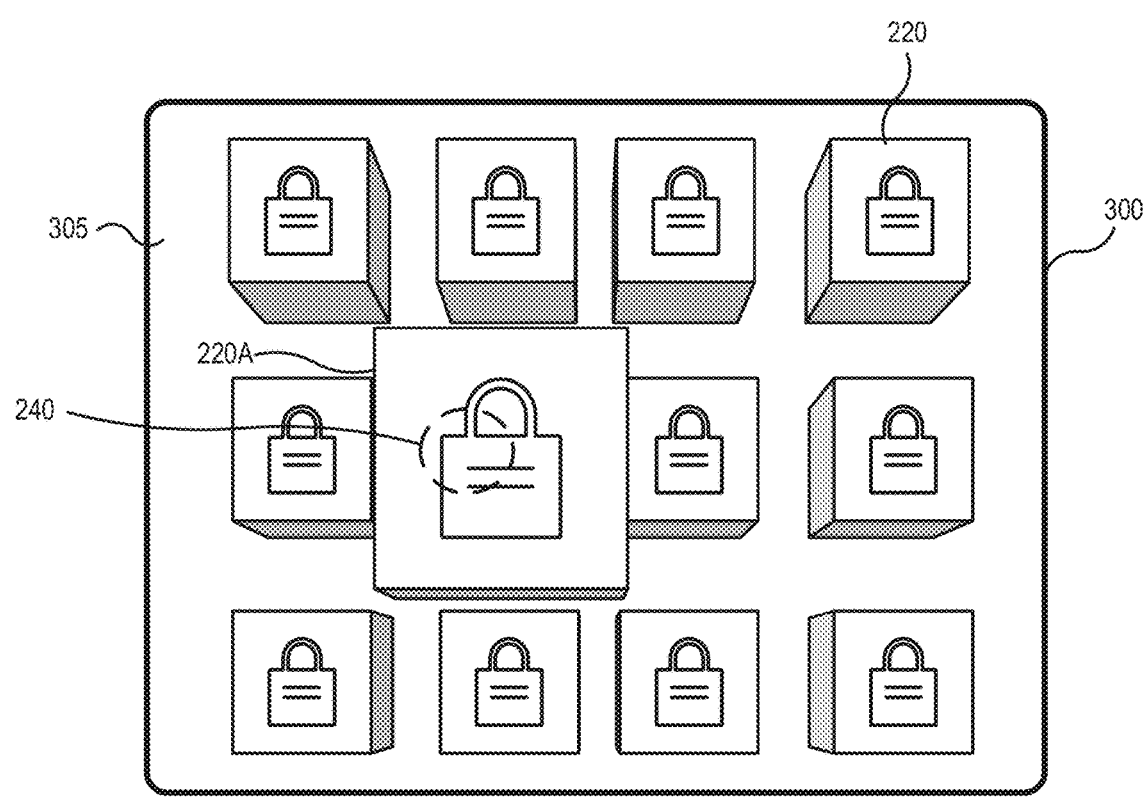
Figure 6D:
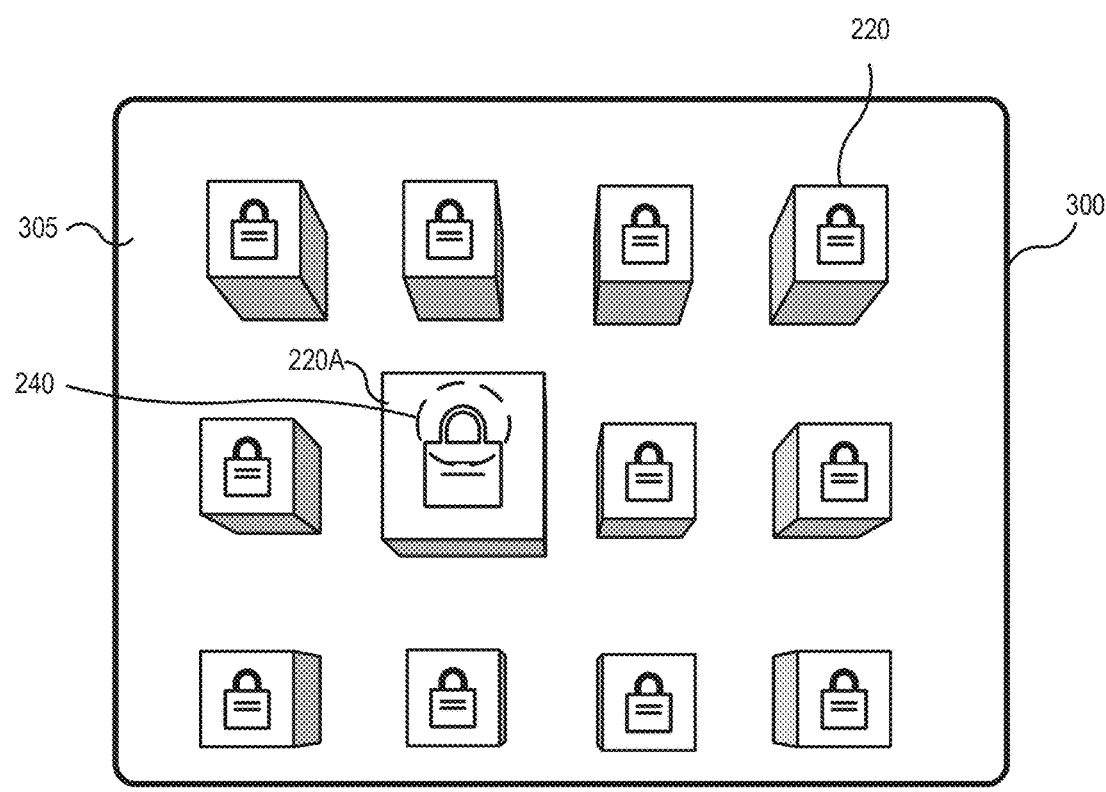
Figure 7A:
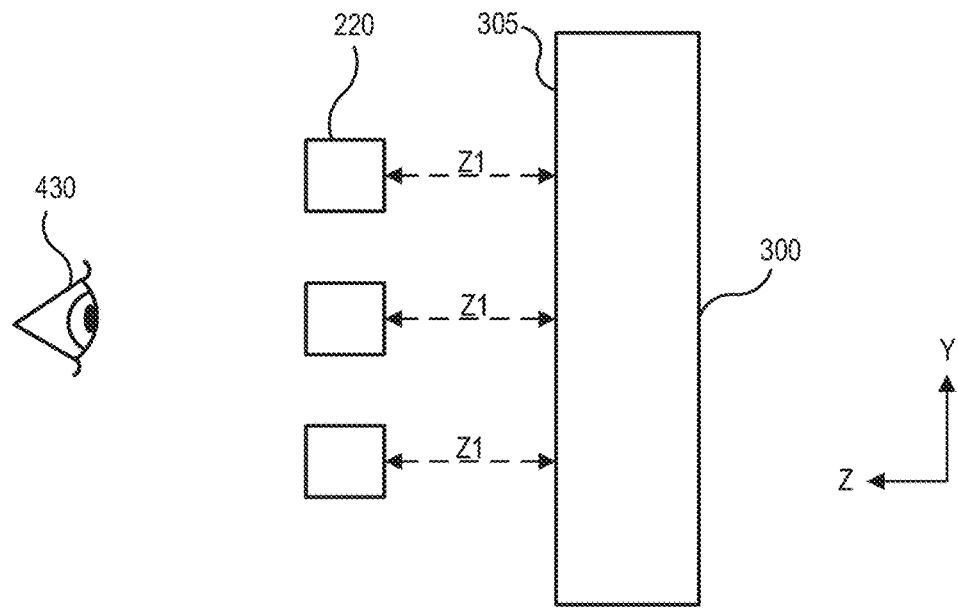
FIGS. 7A, 7B and 7C are side views of a display screen of the EGM of FIG. 1A displaying a plurality of three-dimensional game components.
Figure 7B:
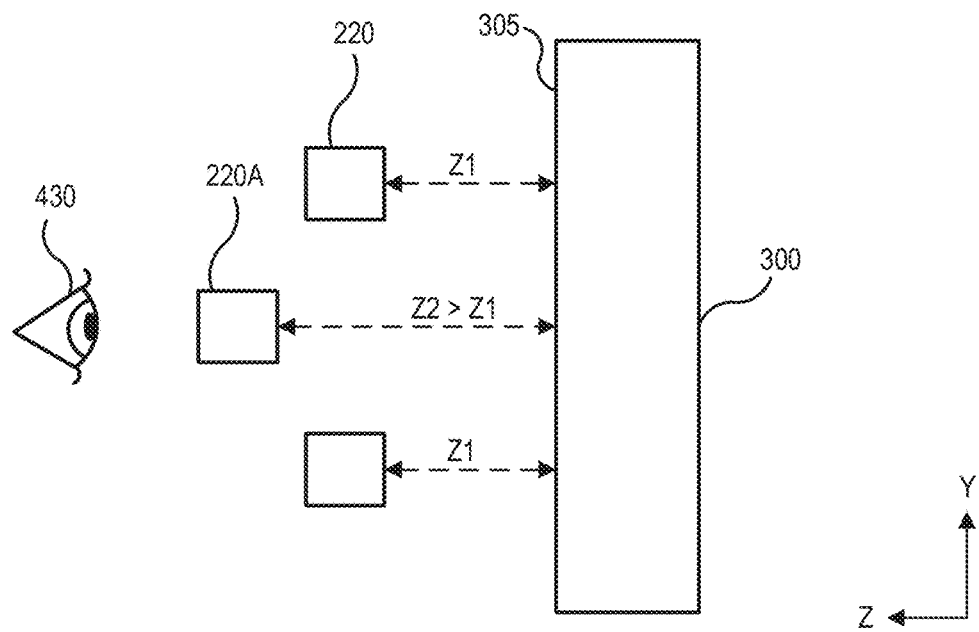
Figure 7C:
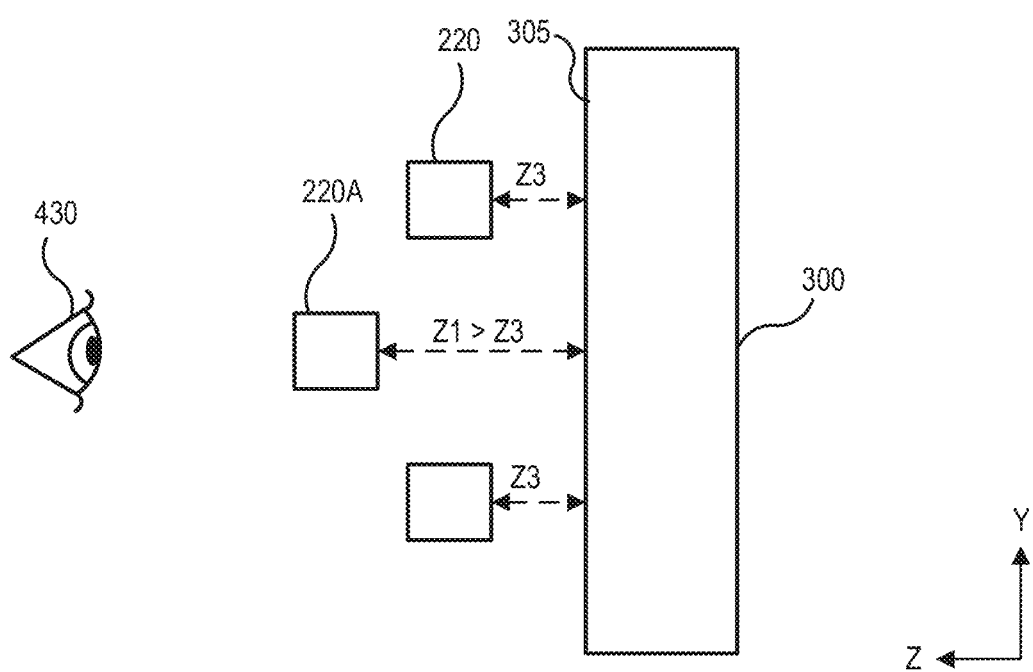

Various example embodiments are illustrated by FIGS. 6A, 6B, 6C, 6D, 7A, 7B and 7C, which show example images displayed to a player by a primary display device 300. FIGS. 6A, 6B, 6C and 6D are front views, and FIGS. 7A, 7B and 7C are side views, of a screen 305 of the primary display device 300. In these examples, an array of game components 220, in the form of three-dimensional boxes on which a lock symbol is displayed, are displayed to the player. Each of the game components 220 is positioned in a three-dimensional Cartesian space defined by mutually perpendicular x- and y-axes that are parallel to the screen 305 of the primary display device 300 and a z-axis that is perpendicular to the screen 305. Each of the game components 220 has an associated depth, or z-axis position. For example, referring to FIGS. 6A and 7A, in the example illustrated therein, each of the game components 220 is rendered to have the same depth, or z-axis position, Z1, so that each of the game components 220 appears in three dimensions to be positioned about the same distance from the screen 305 of the primary display device 300, or alternatively, at about the same distance from the player's eye 430.

Referring to FIG. 6B, when the game components 220 have been rendered and displayed to the player, the gaze detection unit 120 determines a direction of the player's gaze. The direction of the player's gaze is mapped in two or three dimensions to gaze location 240 on or in front of the screen 305. The EGM 100 correlates the gaze location 240 to the displayed locations of the game components 220, and determines that the player is looking at a specific game component, namely the game component 220A.

In response to determining that the player is looking at the game component 220A, the EGM 100 may cause the display controller 52 and graphics processor 54 to change the location of either the identified game component 220A or the other game components 220. In particular, the EGM 100 may cause the display controller 52 and graphics processor 54 to change the z-axis position of either the identified game component 220A or the other game components 220. Changing the z-axis position of a game component 220 causes the game component 220 to move either closer to or farther away from the screen 305 (or in the opposite direction relative to the player). For example, referring to FIGS. 6C and 7B, the EGM may cause the display controller 52 and graphics processor 54 to change the z-axis position of the game component 220A that the player is looking at from the first position Z1 to fa second position Z2 that is greater than Z1, so that that the game component 220A appears to move away from the screen 305 and toward the player.

Alternatively or additionally, referring to FIGS. 6D and 7C, the EGM 100 may cause the display controller 52 and graphics processor 54 to change the z-axis position of the other game components 220 from the first position Z1 to a third position Z3 that is less than Z1, so that that the other game components 220 appear to move away from the screen 305 and toward the player.

In some embodiments, the EGM 100 may cause the display controller 52 and graphics processor 54 to change the z-axis positions of both the viewed game component 220A and the other game components 220 in opposite directions, so that the viewed game component 220A moves toward the viewer and the other game components 220 move away from the viewer. This effect causes the viewed game component 220A to stand out from the other game components 220, and provides a visual indication to the player of which game component the player is about to select.

Figure 8:
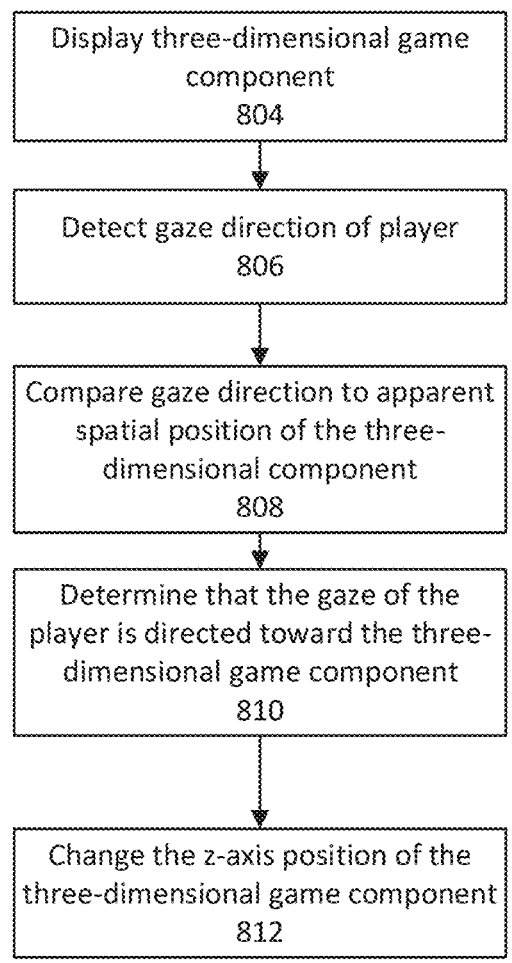
FIGS. 8 and 9 are block diagrams illustrating operations of systems/methods according to some embodiments.
Figure 9:
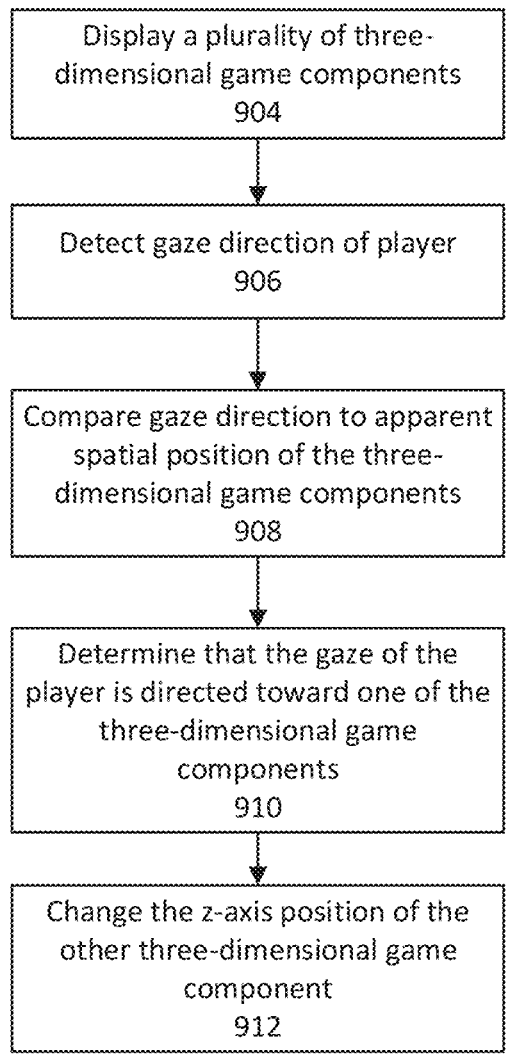

Systems/methods according to some embodiments are illustrated in the flowcharts of FIGS. 8 and 9. Referring to FIG. 8, an EGM 100 according to some embodiments may display (block 804) a three-dimensional game component to a player of the electronic gaming machine, wherein the three-dimensional game component is generated to have an apparent spatial position. The apparent spatial position of the three-dimensional game component may have coordinates including a z-coordinate in a direction extending toward the player. The three-dimensional game component is displayed using the primary display device 300 under control of the display controller 52, as described above.

The EGM 100 then detects a gaze direction of the player (block 806), and compares the gaze direction of the player to the apparent spatial position of the three-dimensional game component (block 808).

The EGM 100 may determine (810) that the gaze of the player is directed toward the three-dimensional game component, and responsive to determining that the gaze of the player is directed toward the three-dimensional game component, the EGM 100 changes (812) the z-coordinate of the apparent spatial position of the three-dimensional game component so that, for example, the three-dimensional game component appears to move toward or away from the player.

Referring to FIG. 9, an EGM 100 according to some embodiments may perform operations including displaying a plurality of three-dimensional game components on a three-dimensional display device (block 904), detecting a gaze direction of the player (block 906) and comparing the detected gaze direction to the apparent spatial positions of the three-dimensional game components (block 908). The EGM 100 may determine that the gaze direction of the player is directed towards one of the three-dimensional game components (block 910), and in response, the EGM 100 may change the apparent spatial position of at least one of the other three-dimensional game components that the player's gaze is not directed towards (block 912).

In some embodiments, the EGM 100 may control the haptic feedback unit 140 to not provide haptic feedback, or to provide different haptic feedback, unless the EGM 100 detects, using the gesture tracking/recognition unit 110, that the player is selecting the viewed game component 220A. That is, in some embodiments, haptic feedback may be disabled or altered unless the player's selection gesture matches the player's gaze direction. This may provide the player with further confidence that the correct game component is being selected.

Figure 10A:
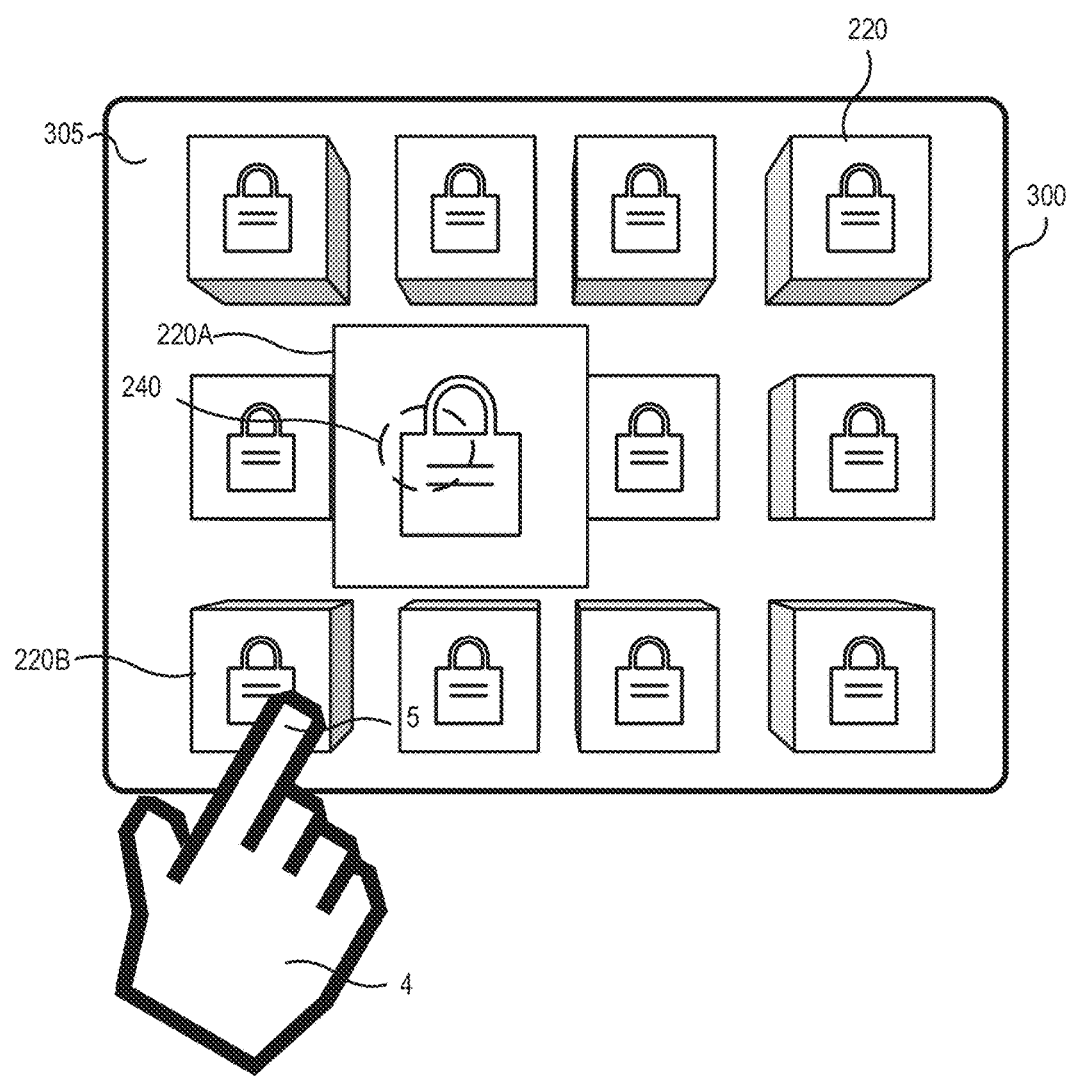
FIGS. 10A and 10B are front views of a display screen of the EGM of FIG. 1A displaying a plurality of three-dimensional game components.
Figure 10B:
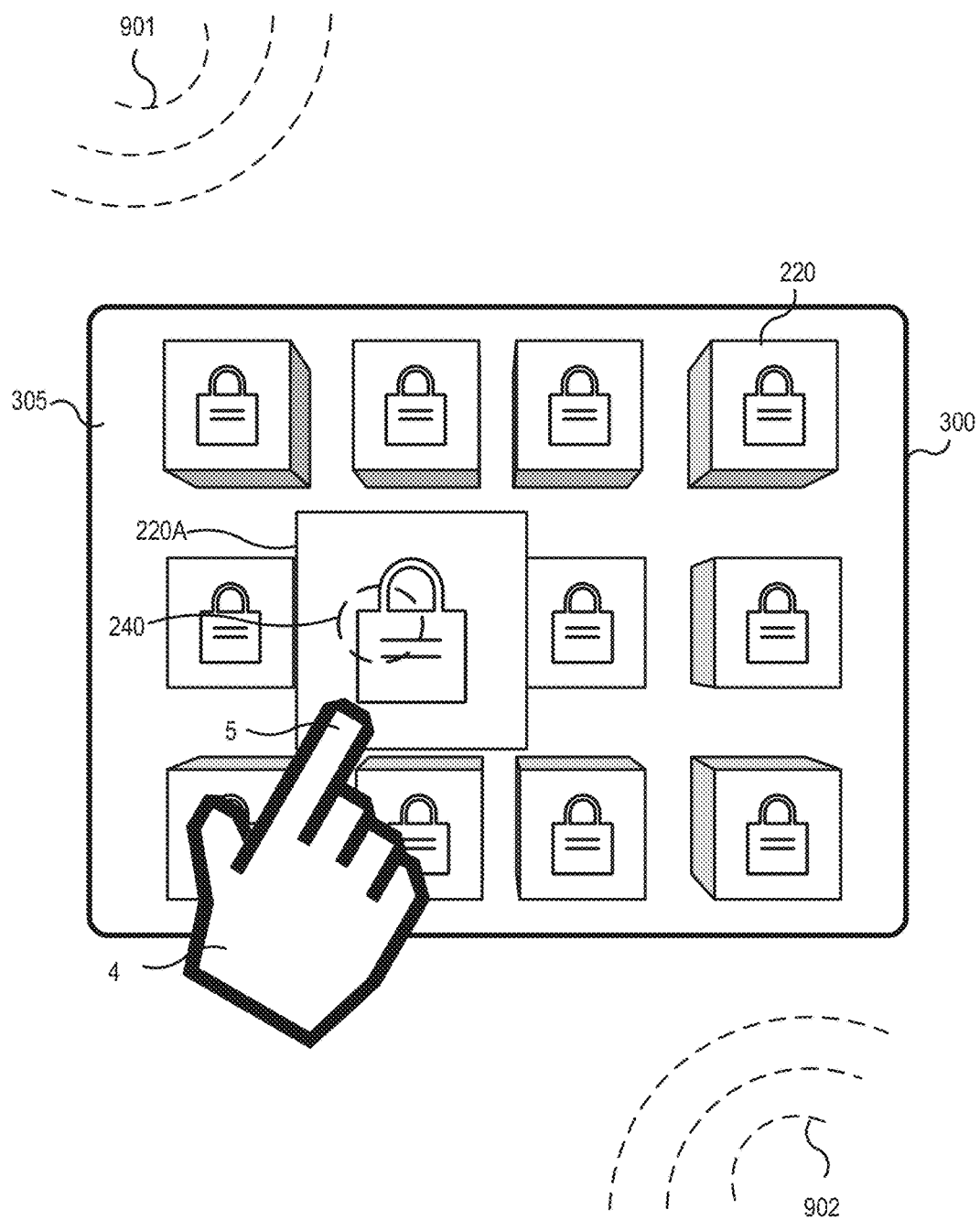

For example, FIGS. 10A and 10B are front views of a screen 305 of a primary display device 300 on which a plurality of game components 220 are displayed in an array. The location of the player's eye gaze is determined by the gaze detection unit 120 and indicated generally at item 240 in FIG. 8A. The EGM 100 determines that the player is looking at the game component 220A, and has caused the display adapter 52 and graphics processor 54 to render the viewed game component 220A so that it appears closer to the player than the other game components. In FIG. 10A, the player's hand 4 and finger 5 are illustrated as moving toward the viewed game component 220A, but currently over a non-viewed game component 220B. In FIG. 10B, the player's finger 5 is illustrated as being positioned over the viewed game component 220A. In FIG. 10A, because the player's hand 4 and finger 5 are not over the viewed game component 220A, the EGM 100 controls the haptic feedback unit 140 to not provide haptic feedback, or to provide different haptic feedback, to the player than is provided when the player's finger 5 is positioned over or on the viewed game component 220A.

In FIG. 10B, when the player's finger 5 is over the viewed game component 220A, the EGM 100 controls the haptic feedback unit 140 to provide haptic feedback to the player in the form of ultrasonic waves 901, 902, which may indicate to the player that the player can or has selected the viewed game component 220A. In addition to haptic feedback, the EGM 100 may provide visual feedback that the player has or can select the viewed game component 220A by causing the viewed game component 220A to move in response to the player's hand/finger position, or to play a sound or animation in response to the player's hand/finger position.

Figure 11:
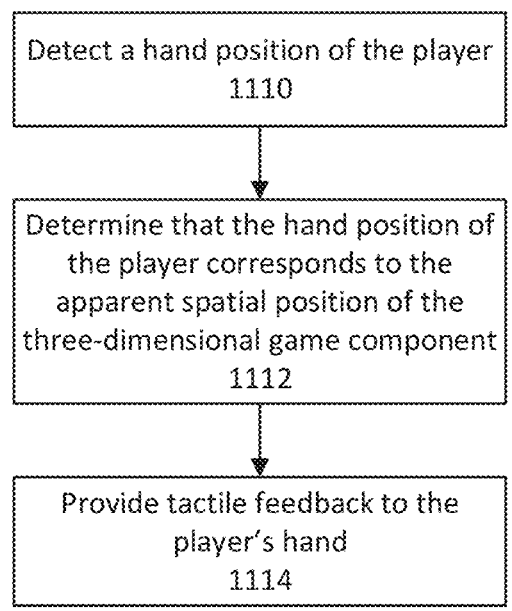
FIGS. 11, 12 and 13 are block diagrams illustrating operations of systems/methods according to some embodiments.

Systems/methods according to some embodiments are illustrated in the flowcharts of FIG. 11. As shown therein, an EGM 100, using a gesture tracking/recognition unit 110, determines a hand position of a player in a player interaction zone 312 (block 110). The EGM 100 determines that the hand position of the player corresponds to the apparent spatial position of a three-dimensional game component displayed by the EGM 100 on the three-dimensional display device 300 (block 112), and in response, provides tactile feedback to the player's hand (block 1114).

In further embodiments, the gaze detection unit 120 and the gesture tracking/recognition unit 110 may and may be used by the EGM 100 to allow the player to move items towards and away from the player as part of a game mechanic. For example, the player may, as part of the game mechanic, look at a 3D game component and "push" it from one location to another location simply by looking at it. That is, the game component may have a first 3D position vector, and when the player looks at the game component, the EGM 100 may alter the 3D position vector of the game component to cause it to move to a new location where the game component will stay until the player looks at it again. Using eye gaze data from the gaze detection unit 120, the EGM 100 detects the game component the player is looking at and adjusts the position of the game component accordingly. Depending on the game design, the player's gaze may cause the game component to move forward, backward, laterally, or a combination of those, in a predetermined path or a random path.

In some embodiments, the position of objects or items other than game components can be manipulated based on the player's gaze. For example, in one embodiment, a credit meter showing the number of credits remaining on the EGM 100 may be displayed to the player as a three-dimensional object. When the player looks at the credit meter, the EGM 100 may cause the credit meter to move toward the player to, for example, improve its visibility. Similarly, in another embodiment, a paytable with various payouts may be displayed to the player. The EGM 100 may detect that the player is looking at a particular payout in the paytable, and in response the EGM 100 may cause the payout that the player is looking at to move towards the player. In still another embodiment, the EGM 100 may display a slot payline on or adjacent to a virtual slot reel, and when the EGM 100 detects that the player is looking at a particular slot payline win, that payline win may pop off the reels and move towards the player.

In still another embodiment, the EGM 100 may display two options, such as two bonus choices, to the player, and the when the player looks at one of the choices, the EGM 100 may cause the choice the player is looking at to move towards the player.

In still further embodiments, the EGM 100 may cause game components or other items to disappear when the player looks at them. For example, the EGM 100 may display a group of bonus items to the player, and when the player looks at an item, the EGM 100 may cause the item to move away from the player or disappear entirely, leaving the remaining items for selection.

In further embodiments, the movement of a viewed game component may be combined with other animations or visual effects. For example, in one embodiment a plurality of animations or objects may be displayed to the player. When the EGM 100 detects that the player is looking at one object or animations, the other objects or animations may move away from the player and may stop animating and/or may be blurred, grayed out or decolorized to remove emphasis. This emphasizes the effect of the 3D animation that the player is looking at.

In another embodiment, a plurality of objects that represent items that may be chosen are displayed to the player. For example, a plurality of balloons may be displayed to the player, and when the EGM 100 detects that the player is looking at a balloon, it may move toward the player and pop, revealing a bonus hidden inside.

Many other embodiments and applications in which gaze detection is coordinated with three-dimensional display, head and eye position tracking, and haptic feedback will be apparent to those familiar with the present disclosure, and the foregoing description of embodiments is not intended to limit the scope of the inventive concepts.

Correlation of Eye/Head Position Tracking and Gaze Detection

As noted above, the eye/head position tracking unit 130 of the EGM 100 includes a camera 320 that monitors eye location, head location and head angle. This information is used by the EGM 100 to create a three-dimensional image that is displayed to the player based on his or her head location, head angle and eye separation. Furthermore, a gaze detection camera 325 monitors the direction in which the player's eyes are focusing. The gaze detection unit 120 uses this information to determine where on the display screen 300 the player is looking. The information from the eye/head position tracking camera 320 of the eye/head position tracking unit 130 can be compared against the gaze detection information from the gaze detection camera 325 of the gaze detection unit 120 to determine if the data matches. If the head angle detected by the eye/head position tracking unit 130 matches the gaze direction detected by the gaze detection unit 120, then the EGM 100 can determine with a high degree of confidence that the detected eye gaze location and head position are correct, and that the player is positively looking at an item on the screen.

Likewise if the head position and/or head angle of the player detected by the eye/head position tracking unit 130 predicts an eye gaze location that is significantly different from the eye gaze location determined by the gaze detection unit 120, the EGM 100 may determine that the player may not be actively looking at item, and may not cause the item to move in three dimensions in response.

In this regard, the gaze detection unit 120 and the eye/head position tracking unit 130 may be used to calibrate one another. For example, during calibration of the gaze detection unit 120, data from the eye/head position tracking unit 130 may be collected and compared with eye gaze data to determine if the eye/head position tracking unit 130 is out of calibration, and vice versa. That is, during calibration of the eye/head position tracking unit 130, data from the gaze detection unit 120 may be collected and compared with eye gaze data to determine if the gaze detection unit 120 is out of calibration.

In some embodiments, the EGM 100 may calibrate the gaze detection unit 120 and/or the eye/head position tracking unit 130 in-game or between games by displaying a game component or other object that that the player is incentivized to look at. For example, the EGM 100 may display an object in three-dimensional space and indicate that the player will receive a free play if he or she follows the object from a starting location to an ending location. As the player's eyes follow the moving object, and the position of the moving object is known to the EGM 100, the EGM 100 may collect eye gaze data from the gaze detection unit 120 and head position and angle information from the eye/head position tracking unit 130 and adjust the calibration of the gaze detection unit 120 and the eye/head position tracking unit 130.

In further embodiments, the EGM 100 may display an image of a three-dimensional object to a player and prompt the player to "touch" the three-dimensional image with his or her hand. The EGM 100 may then cause the three-dimensional image to move, and prompt the player to follow the three-dimensional image with his or her hand. While the player follows the three-dimensional image with his or her hand, it can be expected that the player will also follow the three-dimensional object with his or her gaze. The EGM 100 may provide visual and/or auditory feedback to the player to confirm that the player's touch and/or gaze is following the three-dimensional image, such as by causing the object in the image to glow when the player's touch and/or gaze follows the image, by playing a sound and/or increasing a sound level when the player's touch and/or gaze follows the image, by providing haptic feedback when the player's touch and/or gaze follows the image, etc.

The motion tracking and/or gaze detection data captured during this process may be used to calibrate the gaze detection unit 120, the eye/head position tracking unit 130 and/or the gesture tracking/recognition unit 110.

Figure 12:
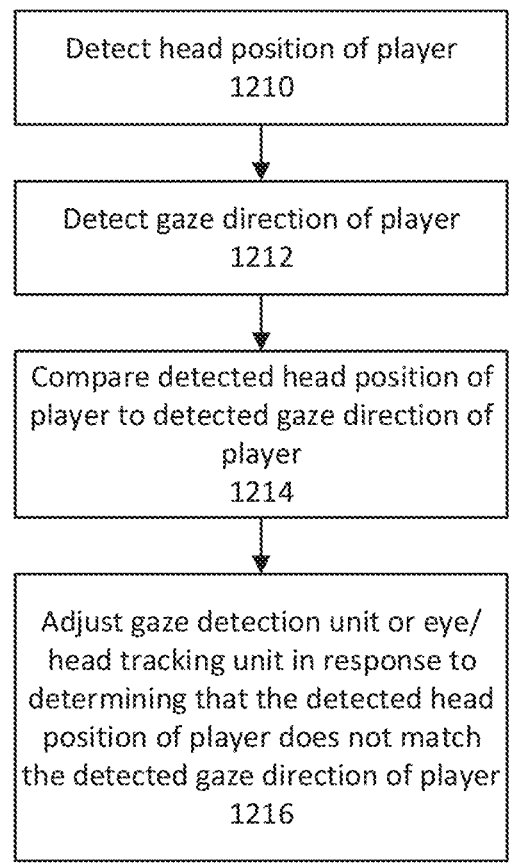
Figure 13:
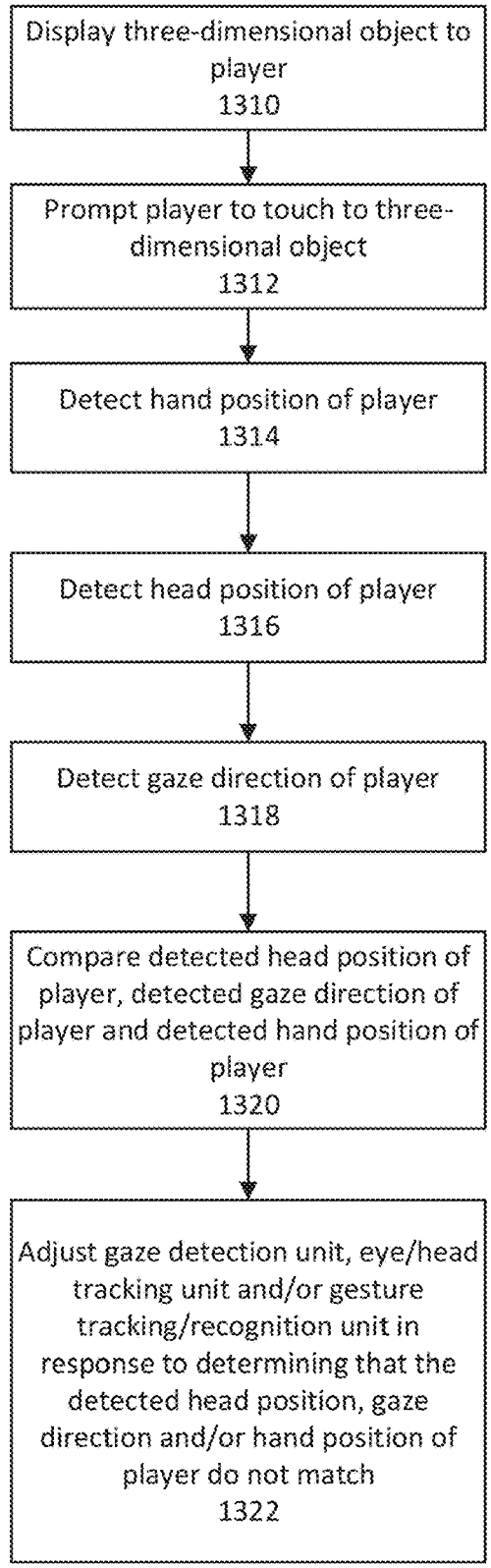

Calibration systems/methods are illustrated in the flow-charts of FIGS. 12 and 13. Referring to FIG. 12, in some embodiments, an EGM 100 detects a head position of a player (or user) of the EGM 100 using the eye/head position tracking unit 130 (block 1210) and detects a gaze direction of the player using the gaze detection unit 120 (block 1212). The EGM 100 compares the detected head position of the player to the detected gaze direction of the player (block 1214) and adjusts/calibrates the eye/head position tracking unit 130 and/or the gaze detection unit 120 if the head position and gaze direction of the player do not match.

In further embodiments, as illustrated in FIG. 13, the EGM 100 may, as part of the calibration process, display a three-dimensional object to the player (block 1310) and draw the player's attention to the three-dimensional object, such as by animating the three-dimensional object, changing the color or brightness of the three-dimensional object, or explicitly prompting the player to look at the three-dimensional object (block 1312). In this manner, the EGM 100 may be better able to calibrate the eye/head position tracking unit 130 and/or the gaze detection unit 120, since the apparent position of the displayed object is known to the EGM 100, and the EGM 100 has a high degree of confidence that the player is looking directly at the displayed object.

The EGM 100 may furthermore cause the three-dimensional object to move and prompt the player to follow the three-dimensional object with his or her hand (i.e., continue to touch the object as it moves). The EGM 100 may then detect a hand position of the player (block 1314), detect a head position of the player (block 1316) and detect a gaze direction of the player (block 1318). The EGM 100 then compares the detected head position, hand position and gaze direction of the player (block 1320), and, based on the EGM's knowledge of the actual location of the three-dimensional object, adjust one of the gaze detection unit 120, the eye/head position tracking unit 130 and the gesture tracking unit 110 if the detected head position, eye gaze and/or hand position of the player do not match (block 1322).

Further Example Embodiments

Figure 14:
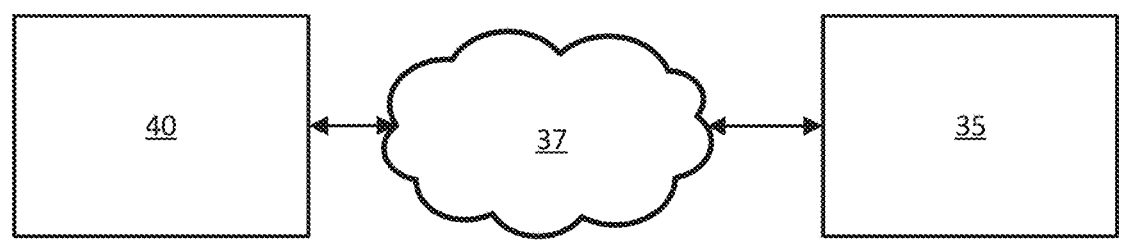
FIG. 14 is a block diagram illustrating an electronic gaming device according to some embodiments connected to a gaming server.

FIG. 14 illustrates an online implementation of a gaming system that may continuously monitor the eye gaze of a player as described herein. The gaming system may be an online gaming device (which may be an example implementation of an EGM). As depicted, the gaming system includes a gaming server 40 and a gaming device 35 connected via a network 37. The eye gaze of the player may be monitored and/or predicted by the gaming device 35 such that data relating to tracked positions, trajectories, etc. may be obtained as described herein.

In some embodiments, the gaming server 40 and the gaming device 35 cooperate to implement the functionality of EGM 100, described above. So, aspects and technical features of EGM 100 may be implemented in part at the gaming device 35, and in part at the gaming server 40.

The gaming server 40 may be configured to enable online gaming, and may include game data and game logic to implement the games and enhancements disclosed herein. For example, the gaming server 40 may include a player input engine configured to process player input and respond according to game rules. The gaming server 40 may include a graphics engine configured to generate the interactive game environment as disclosed herein. In some embodiments, the gaming server 40 may provide rendering instructions and graphics data to the gaming device 35 so that graphics may be rendered at gaming device 35.

The gaming server 40 may also include a movement recognition engine that may be used to process and interpret collected player eye gaze data, player eye gesture data, and player movement data, to transform the data into data defining manipulations and player interaction commands.

The network 37 may be any network (or multiple networks) capable of carrying data including the Internet, Ethernet, POTS line, PSTN, ISDN, DSL, coaxial cable, fiber optics, satellite, mobile, wireless (e.g. WMAX), SS7 signaling network, fixed line, local area network, wide area network, and others, including any combination of these.

The gaming device 35 may be particularly configured with hardware and software to interact with the gaming server 40 via the network 37 to implement gaming functionality and render 2D or 3D enhancements, as described herein. For simplicity, only one gaming device 35 is shown but an electronic gaming system may include one or more gaming devices 35 operable by different players. The gaming device 35 may be implemented using one or more processors and one or more data stores configured with database(s) or file system(s), or using multiple devices or groups of storage devices distributed over a wide geographic area and connected via a network (which may be referred to as "cloud computing"). Aspects and technical features of the EGM 100 may be implemented using the gaming device 35.

The gaming device 35 may reside on any networked computing device, such as a personal computer, workstation, server, portable computer, mobile device, personal digital assistant, laptop, tablet, smart phone, an interactive television, video display terminals, gaming consoles, electronic reading device, and portable electronic devices or a combination of these.

The gaming device 35 may include any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Gaming device 35 may include any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The gaming device 35 may be operable to register and authenticate users (using a login, unique identifier, and password for example) prior to providing access to applications, a local network, network resources, other networks and network security devices. The computing device may serve one user or multiple users.

The gaming device 35 may include one or more input devices (e.g. player control inputs 50), such as a keyboard, mouse, camera, touch screen and a microphone, and may also include one or more output devices such as a display screen (with 3D capabilities) and a speaker. The gaming device 35 has a network interface in order to communicate with other components, to access and connect to network resources, to serve an application and other applications, and perform other computing applications.

The gaming device 35 connects to gaming server 40 by way of network 37 to access technical 2D and 3D enhancements to games as described herein. Multiple gaming devices 35 may connect to gaming server 40, each gaming device 35 operated by a respective player.

The gaming device 35 may be configured to connect to one or more other gaming devices through, for example, the network 37. In some embodiments, the gaming server 40 may be utilized to coordinate the gaming devices 35. Where gaming devices 35 may be utilized to facilitate the playing of a same game, such as an interactive game, wherein the interactive game includes at interaction between activities performed by the players on the gaming devices 35, various elements of information may be communicated across the network 37 and/or the server 40. For example, the elements of information may include player eye gaze data, player eye gesture data, player movement data, and/or the viewing area displayed on the gaming device 35. This information may be used by each of the gaming devices 35 to provide and/or display interfaces that take into consideration the received data from another gaming device 35. The gaming devices 35 may be configured for cooperative and/or competitive play (or a combination thereof) between the players in relation to various game objectives, events, and/or triggers.

While playing an interactive game on the EGM 100, the eyes of a player may move suddenly without the player being conscious of the movement. The eyes of the player may demonstrate subconscious, quick, and short movements, even if the player is not actively controlling their eyes to move in this manner. These subconscious, quick, and short eye movements may affect the game controller's determination of the eye gaze of the player based on the player eye gaze data. Accurate processing of the player eye gaze data related to these subconscious, quick, and short eye movements may result in detecting the location of the eye gaze of the player representative of eye twitching or erratic eye movements not reflective of the player's intended eye gaze, and may be distracting to the player. It may be useful for the player eye gaze data to be filtered to not reflect these quick and short eye movements, for example, so the determination of the eye gaze of the player relative to the viewing area by the game controller reflects the intended eye gaze of the player. It may also be useful for the portion of the player eye gaze data representative of the subconscious, quick, and short eye movements to have less determinative effect on the determined location of the eye gaze of the player. In some embodiments, the game controller 44 may define a filter movement threshold, wherein the game controller, prior to determining a location of the eye gaze of the player relative to the viewing area using the player eye gaze data collected by the data capture camera device 25 and updating the rendering of the viewing area, determines that the player eye gaze meets the filter movement threshold. The data capture camera device 25 may collect player eye gaze data.

The game controller 44 may process the player eye gaze data to correspond with a location on the viewing area. The game controller 44 may determine where the player is looking at on the viewing area based on a certain number of previously recorded player eye gaze data, for example, by tracking the last ten eye gaze positions to average out where on the viewing area the player is looking. The game controller 44 may limit the amount of previously recorded player eye gaze data that is used to determine where on the viewing area the player is looking. The game controller 44 may filter out, or "smooth out", player eye gaze data outside of the pre-determined filter movement threshold, which may represent sudden and subconscious eye movement. The game controller 44 may map the eye gaze of the player to the viewing area using at least a portion of the filtered player eye gaze data to determine the location of the viewing area at which the player is looking, in order to map the player's eye gaze to the viewing area.

As another example, the game controller 44 may delay in processing the player eye gaze data associated with subconscious, quick, and short eye movements, so the detected location of the eye gaze of the player does not represent twitching or sudden unconscious eye movements which may trigger animation effects causing an unpleasant user experience. Large eye motions may also be associated with more delay in processing and more smoothing. In some embodiments, the game controller may partition the player eye gaze data associated with large eye motions into data representative of shorter eye motions. The game controller 44 may analyze the player eye gaze data to determine which data is associated with subconscious eye movement or with conscious eye movement based on a filter movement threshold, a time threshold, movement threshold, or any combination thereof. Player eye gaze data associated with quick eye movements over a certain period of time may be determined by the game controller 44 to be subconscious eye movement. The game controller 44 may delay in processing this portion of data so the detected location of the eye gaze of the player may be stable and may not distract the player, or the game controller may filter out this data and not process it. Player eye gaze data associated with large eye movements over a certain period of time may be determined by the game controller to be the player losing focus or being distracted. The game controller 44 may similarly delay in processing this portion of data or not process this portion of data. In some embodiments, game controller 44 may filter out, or "smooth out" player eye gaze data, player eye gesture data, player movement data, or a combination thereof, that may exceed the filter movement threshold, in the manner described herein.

The locations where the EGM 100 may be used may have a variety of lighting conditions. For example, the EGM 100 may be used in a restaurant, a hotel lobby, an airport, and a casino. It may be brighter in some locations and darker in other locations, or the light quality may fluctuate from brightness to darkness. In some embodiments, EGM 100 may include an infrared light source that illuminates the player. The infrared light sources may not interfere with the eyes of the player. In some embodiments, the data capture camera device 25 may be an infrared data capture camera device. The infrared data capture camera device may collect player eye gaze data, player eye gesture data, and player movement data without being affected by the lighting conditions of the locations where EGM 100 may be used. In some embodiments, the EGM 100 may have a plurality of light sources providing a plurality of spectra of light, and the data capture camera device 25 may be a plurality of data capture camera devices configured to detect a plurality of spectra of light, so the data capture camera device 25 may collect player eye gaze data, player eye gesture data, and player movement data without being affected by the lighting conditions of the locations where EGM 100 may be used.

A player that plays an interactive game using EGM 100 may be wearing glasses. The glasses of the player may cause refractions of the light that illuminates the player. This may affect the data capture camera device 25 while it monitors the eye gaze, eye gesture, and/or movement of the player. Glasses that comprise an infrared filter may also interfere with or affect the data capture camera device 25 while it monitors the eye gaze, eye gesture, and/or movement of the player. The EGM 100 may recognize that the player may be wearing glasses. For example, as the interactive game commences, display controller 52 may display on display device 300 using graphics processor 54 a question asking the player if he or she is wearing glasses. The player may provide input indicating whether he or she is wearing glasses, such as, but not limited to, with an audio command, touch command, or with the player's eye gaze. As other example, the game controller 44 may recognize, based on processing the player eye gaze data from the data capture camera device 25, that the light illuminating the player may be refracted, and may determine that the player is wearing glasses. When EGM 100 recognizes that the player may be wearing glasses, the game controller 44 may perform additional and/or more stringent filtering functions as described herein to compromise for the player's use of glasses and to accommodate the refractions of the light that illuminates the player. For example, the filter movement threshold may be set to be higher for players who wear glasses.

In some embodiments, the game controller 44 may be configured to predict the location of the eye gaze of the player relative to the viewing area at a future time using the player eye gaze data to facilitate dynamic update to the rendering of the viewing area. For example, if the game controller 44 determines that a player is changing their gaze on a horizontal plane from the left to the right, the game controller 44 may predict that the player may look at a game component displayed on the right side of display device 300. The ability for game controller 44 to predict the location of the eye gaze of the player at a future time may be useful to rule out inaccurate readings. For example, while a player plays a game, the data capture camera device 25 may incorrectly detect a button on the clothing of a player to be the player's eyes, and may collect incorrect player eye gaze data based on the button. Based on the location of the eye gaze predicted by game controller 44, the incorrect player eye gaze data may be ruled out by game controller 44, and may not be processed by game controller 44 to trigger a control command to update the viewing area with a graphical animation effect. As another example, by predicting the location of the eye gaze, the display controller 52 may adjust the resolution of the display device 300 where the player is not expected to be looking. This may be useful because the EGM 100 may have limited processing power. Not all visible game components may require high resolution. Only the game components that the player is looking at may require high resolution. The ability for game controller 44 to predict the location of the eye gaze of the player may allow display controller 52 to reduce the resolution of game components that the player may not be looking at, which may increase the efficiency of the processing power of the EGM 100.

In some embodiments, the EGM 100 may apply one or more predictive techniques to develop a plurality of predicted points of eye gaze, which, for example, may approximate and/or estimate where a player's gaze will travel next. These predictions may also be provided for use by graphics processor 54 and/or game controller board 44 in relation with smoothing out and/or accounting for removal of transient readings, undesirable artefacts and/or inadvertent gaze positions. In some embodiments, the predictions may also be used to improve the performance of EGM 100 in relation to gaze capture and/or processing thereof, by, for example, applying heuristic techniques to reduce the number of computations and/or capture frequency by relying on predictions to interpolate and/or extrapolate between gaze positions captured.

For example, when a player looks at a location of a viewing area in an interactive game, the EGM 100 may record where they were looking and what events are being displayed to the player (e.g., as first movements and/or gaze positions). When an event is triggered a second time, the player's gaze movements are recorded into a data storage system, but then compared to the first movements. A comparison may include, for example, comparing positions, velocities, start and end positions, accelerations, etc. as between various gaze movements.

For example, for each duration, a path and end location may be calculated, and a predicted pathway may be developed based on these locations and stored in a data storage.

As the event is triggered more times (e.g., more iterations occur), the data may be accumulated and a predictive pathing model can be built. Once the predictive pathing model is developed, when the event is triggered, the EGM 100 could reduce the frequency of the gaze system updates and use the recorded pathing and final location to be used to reduce the overall computing resources required, for example (e.g., performing various steps of interpolation, extrapolation using the predictive pathing model).

Accordingly, predictive pathing can also be used to reduce errors being produced by the gaze system. Gaze systems may utilize cameras and edge detection to determine where the player is looking, and many utilize use infra-red light to see the player's eye. If there are other infra-red light sources, for example, such sources may cause the gaze camera to be impacted and may reduce accuracy of the gaze detection. Accordingly, predictive pathing may be useful to reduce error in similar situations where there may otherwise be recorded errors and/or aberrations.

Further, predictions may not be limited only to a current player. For example, aggregate information from a large population of players may be aggregated together to refine the model for predictive pathing. The model may, for example, take into consideration the type of player, the type of interaction the player is having with the EGM 100, the characteristics of the player (e.g., height, gender, angle of incidence), among others.

In some embodiments, the predictive pathing model may also be utilized in the context of a game. For example, if the game includes aspects which may be selectively triggered based on various inputs, an input for triggering may include predicted pathways. In some embodiments, objects and/or layers may be modified and/or altered.

Further Definitions

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. The devices provide improved computer solutions for hardware limitations such as display screen, display device, and so on.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Embodiments described herein involve computing devices, servers, electronic gaming terminals, receivers, transmitters, processors, memory, display, and networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Embodiments described herein may be implemented by using hardware only or by using software and a necessary universal hardware platform. Based on such understandings, the technical solution of embodiments may be in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware. The embodiments described herein provide useful physical machines and particularly configured computer hardware arrangements. The embodiments described herein are directed to electronic machines methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components. Substituting the computing devices, servers, receivers, transmitters, processors, memory, display, networks particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A method of operating an electronic gaming machine, comprising:
    displaying a plurality of three-dimensional game components to a viewer of the electronic gaming machine, wherein each three-dimensional game component of the plurality of three-dimensional game components is generated to have an apparent spatial position, the apparent spatial position of the three-dimensional game component having coordinates including a z-coordinate in a direction extending toward the viewer;
    detecting a gaze direction of the viewer;
    comparing the gaze direction of the viewer to the apparent spatial position of a first three-dimensional game component of the plurality of game components and the apparent spatial position of a second three-dimensional game component of the plurality of game components;
    determining that the gaze of the viewer is directed toward the first three-dimensional game component; and
    responsive to determining that the gaze of the viewer is directed toward the first three-dimensional game component, changing the z-coordinate of the apparent spatial position of one of the first three-dimensional game component and the second three-dimensional game component.

2. The method of claim 1, wherein changing the z-coordinate of one of the first three-dimensional game component and the second three-dimensional game component comprises moving the apparent spatial position of the first three-dimensional game component towards the viewer.

3. The method of claim 1, wherein changing the z-coordinate of one of the first three-dimensional game component and the second three-dimensional game component comprises moving the apparent spatial position of the first three-dimensional game component away from the viewer.

4. The method of claim 1, further comprising:
determining that the gaze of the viewer is not directed toward the second three-dimensional game component,
wherein changing the z-coordinate of the apparent spatial position of one of the first three-dimensional game component and the second three-dimensional game component is further responsive to determining that the gaze of the viewer is not directed toward the second three-dimensional game component.

5. The method of claim 4, wherein changing the z-coordinates of one of the first three-dimensional game component and the second three-dimensional game component comprises moving the apparent spatial position of the second three-dimensional game component towards the viewer.

6. The method of claim 4, wherein changing the z-coordinates of one of the first three-dimensional game component and the second three-dimensional game component comprises moving the apparent spatial position of the second three-dimensional game component away from the viewer.

7. The method of claim 1, further comprising:
detecting a position of a part of a hand of the viewer in a viewer interaction zone between the electronic gaming machine and the viewer;
determining that the position of the part of the viewer's hand corresponds to the apparent spatial position of the first three-dimensional game component while the gaze of the viewer is directed toward the first three-dimensional game component; and
providing tactile feedback to the part of the viewer's hand based on the determined position of the part of the viewer's hand in front of the display device.

8. The method of claim 7, wherein providing tactile feedback to the part of the viewer's hand comprises transmitting ultrasonic sound waves towards the part of the viewer's hand.

9. The method of claim 7, further comprising:
determining that the position of the part of the viewer's hand corresponds to the apparent spatial position of the second three-dimensional game component while the gaze of the viewer is directed toward the first three-dimensional game component; and
providing different tactile feedback to the part of the viewer's hand based on the determined position of at least part of the viewer's hand in front of the display device.

10. The method of claim 7, further comprising:
determining that the position of the part of the viewer's hand corresponds to the apparent spatial position of the second three-dimensional game component while the gaze of the viewer is directed toward the first three-dimensional game component; and
providing no tactile feedback to the part of the viewer's hand while the position of the part of the viewer's hand corresponds to the apparent spatial position of the second three-dimensional game component and the gaze of the viewer is directed toward the first three-dimensional game component.

11. The method of claim 7, further comprising:
providing audible feedback to the viewer in response to determining that the position of the part of the viewer's hand corresponds to the apparent spatial position of the first three-dimensional game component and the gaze of the viewer is directed toward the first three-dimensional game component.

12. The method of claim 1, wherein the viewer is a player of a game on the electronic gaming machine.

13. The method of claim 1, wherein the viewer is a bystander who is not actively engaged in playing a game on the electronic gaming machine.

14. An electronic gaming machine, comprising:
a three-dimensional display device;
a gaze detection unit coupled to the game controller and configured to detect a gaze direction of a viewer;
a processor circuit; and
a memory comprising machine-readable instructions that, when executed by the processor circuit, cause the processor circuit to:
cause the three-dimensional display device to display three-dimensional images on the three-dimensional display device, the three-dimensional images including a plurality of three-dimensional game components, wherein each three-dimensional game component is generated to have an apparent spatial position having coordinates including a z-coordinate in a direction extending toward a viewer of the electronic gaming machine,
determine that the gaze of the viewer is directed toward a first three-dimensional game component of the plurality of three-dimensional game components, and
responsive to determining that the gaze of the viewer is directed toward the first three-dimensional game component, change the z-coordinate of the apparent spatial position of one of the first three-dimensional game component and a second three-dimensional game component.

15. The electronic gaming machine of claim 14, wherein the machine-readable instructions that change the z-coordinate of the apparent spatial position of one of the first three-dimensional game component and a second three-dimensional game component further cause the processor circuit to move the apparent spatial position of the first three-dimensional game component towards the viewer.

16. The electronic gaming machine of claim 14, further comprising:
a gesture tracking unit coupled to the game controller to detect a position of a part of a hand of the viewer in a viewer interaction zone between the electronic gaming machine and the viewer; and
a haptic feedback unit coupled to the game controller;
wherein the machine-readable instructions further cause the processor circuit to:
determine that the position of the part of the viewer's hand corresponds to the apparent spatial position of the first three-dimensional game component while the gaze of the viewer is directed toward the first three-dimensional game component; and
cause the haptic feedback unit to provide tactile feedback to the at least one part of the viewer's hand based on the determined position of the part of the viewer's hand in front of the display device.

17. The electronic gaming machine of claim 16, wherein providing tactile feedback to the part of the viewer's hand comprises transmitting ultrasonic sound waves towards the part of the viewer's hand.

18. The electronic gaming machine of claim 16, wherein the machine-readable instructions further cause the processor circuit to:
   determine that the position of the part of the viewer's hand corresponds to the apparent spatial position of the second three-dimensional game component while the gaze of the viewer is directed toward the first three-dimensional game component; and
   cause the haptic feedback unit to provide different tactile feedback to the part of the viewer's hand based on the determined position of the part of the viewer's hand in front of the display device.

19. The electronic gaming machine of claim 16, wherein the machine-readable instructions further cause the processor circuit to:
   determine that the position of the part of the viewer's hand corresponds to the apparent spatial position of the second three-dimensional game component while the gaze of the viewer is directed toward the first three-dimensional game component; and
   cause the haptic feedback unit to provide no tactile feedback to the part of the viewer's hand while the position of the part of the viewer's hand corresponds to the apparent spatial position of the second three-dimensional game component and the gaze of the viewer is directed toward the first three-dimensional game component.

20. The electronic gaming machine of claim 16, further comprising:
   an audio board coupled to the processor circuit; and
   a speaker coupled to the audio board;
   wherein the machine-readable instructions further cause the processor circuit to provide audible feedback to the viewer in response to determining that the position of the at least one part of the viewer's hand corresponds to the apparent spatial position of the first three-dimensional game component and the gaze of the viewer is directed toward the first three-dimensional game component.

* * * * *